(12) United States Patent
Kuno et al.

(10) Patent No.: US 8,610,028 B2
(45) Date of Patent: Dec. 17, 2013

(54) LASER PROCESSING DEVICE

(75) Inventors: Koji Kuno, Hamamatsu (JP); Tatsuya Suzuki, Hamamatsu (JP); Norio Kurita, Hamamatsu (JP); Tetsuya Osajima, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 581 days.

(21) Appl. No.: 12/443,045

(22) PCT Filed: Sep. 26, 2007

(86) PCT No.: PCT/JP2007/068660
§ 371 (c)(1),
(2), (4) Date: Apr. 22, 2009

(87) PCT Pub. No.: WO2008/041581
PCT Pub. Date: Apr. 10, 2008

(65) Prior Publication Data
US 2010/0025386 A1 Feb. 4, 2010

(30) Foreign Application Priority Data
Oct. 2, 2006 (JP) ................. P2006-270878

(51) Int. Cl.
*B23K 26/14* (2006.01)
*B23K 26/16* (2006.01)
*B23K 26/06* (2006.01)

(52) U.S. Cl.
USPC ................. 219/121.67; 219/121.75

(58) Field of Classification Search
USPC ............. 219/121.67, 121.72, 121.73, 121.75, 219/121.77, 121.68, 121.69
See application file for complete search history.

(56) References Cited

U.S. PATENT DOCUMENTS

| 4,546,231 A | 10/1985 | Gresser et al. |
| 4,908,493 A * | 3/1990 | Susemihl ................ 219/121.67 |

(Continued)

FOREIGN PATENT DOCUMENTS

| CN | 1160228 A | 9/1997 |
| CN | 1720117 | 1/2006 |

(Continued)

OTHER PUBLICATIONS

U.S. Appl. No. 13/206,181, filed Aug. 9, 2011.

(Continued)

*Primary Examiner* — Henry Yuen
*Assistant Examiner* — Thomas Ward
(74) *Attorney, Agent, or Firm* — Drinker Biddle & Reath LLP

(57) ABSTRACT

An apparatus comprises a table, a source emitting polarized laser light, a source emitting laser light, a plate changing the polarization direction of the laser light, a plate splitting the laser light into a laser light having polarization in an X direction and a laser light component having polarization in a Y direction, a plate orienting the polarization direction of the laser light to the X direction, a lens converging the laser light components, a lens arranged in parallel with the lens along the X direction and converges the laser light component, a control section controlling a device such that a converging point of the laser light component is located at a predetermined position with reference to a front face by detecting a reflected light, and a control section moving the table along a line while making the X direction substantially coincide with the line.

10 Claims, 19 Drawing Sheets

(56) References Cited

U.S. PATENT DOCUMENTS

| | | |
|---|---|---|
| 6,992,026 B2 | 1/2006 | Fukuyo et al. |
| 7,078,651 B2 * | 7/2006 | Jennings .................. 219/121.8 |
| 7,396,742 B2 | 7/2008 | Fukuyo et al. |
| 7,489,454 B2 | 2/2009 | Fukuyo et al. |
| 7,547,613 B2 | 6/2009 | Fukuyo et al. |
| 7,566,635 B2 | 7/2009 | Fujii et al. |
| 7,592,237 B2 | 9/2009 | Sakamoto et al. |
| 7,592,238 B2 | 9/2009 | Fukuyo et al. |
| 7,605,344 B2 | 10/2009 | Fukumitsu |
| 7,608,214 B2 | 10/2009 | Kuno et al. |
| 7,615,721 B2 | 11/2009 | Fukuyo et al. |
| 7,626,137 B2 | 12/2009 | Fukuyo et al. |
| 7,709,767 B2 | 5/2010 | Sakamoto |
| 7,718,510 B2 | 5/2010 | Sakamoto et al. |
| 7,719,017 B2 | 5/2010 | Tanaka |
| 7,732,730 B2 | 6/2010 | Fukuyo et al. |
| 7,749,867 B2 | 7/2010 | Fukuyo et al. |
| 7,754,583 B2 | 7/2010 | Sakamoto |
| 7,825,350 B2 | 11/2010 | Fukuyo et al. |
| 7,897,487 B2 | 3/2011 | Sugiura et al. |
| 7,902,636 B2 | 3/2011 | Sugiura et al. |
| 7,939,430 B2 | 5/2011 | Sakamoto et al. |
| 7,947,574 B2 | 5/2011 | Sakamoto et al. |
| 2005/0202596 A1 | 9/2005 | Fukuyo et al. |
| 2005/0272223 A1 | 12/2005 | Fujii et al. |
| 2006/0144828 A1 * | 7/2006 | Fukumitsu et al. ...... 219/121.67 |
| 2006/0148212 A1 | 7/2006 | Fukuyo et al. |
| 2006/0255024 A1 | 11/2006 | Fukuyo et al. |
| 2007/0085099 A1 | 4/2007 | Fukumitsu et al. |
| 2007/0125757 A1 | 6/2007 | Fukuyo et al. |
| 2007/0158314 A1 | 7/2007 | Fukumitsu et al. |
| 2007/0252154 A1 | 11/2007 | Uchiyama et al. |
| 2008/0035611 A1 | 2/2008 | Kuno et al. |
| 2008/0037003 A1 | 2/2008 | Atsumi et al. |
| 2008/0090382 A1 | 4/2008 | Fujii et al. |
| 2008/0218735 A1 | 9/2008 | Atsumi et al. |
| 2008/0251506 A1 | 10/2008 | Atsumi et al. |
| 2009/0008373 A1 | 1/2009 | Muramatsu et al. |
| 2009/0032509 A1 | 2/2009 | Kuno et al. |
| 2009/0098713 A1 | 4/2009 | Sakamoto |
| 2009/0107967 A1 | 4/2009 | Sakamoto et al. |
| 2009/0117712 A1 | 5/2009 | Sakamoto et al. |
| 2009/0166342 A1 | 7/2009 | Kuno et al. |
| 2009/0166808 A1 | 7/2009 | Sakamoto et al. |
| 2009/0250446 A1 | 10/2009 | Sakamoto |
| 2009/0261083 A1 | 10/2009 | Osajima et al. |
| 2009/0302428 A1 | 12/2009 | Sakamoto et al. |
| 2010/0006548 A1 | 1/2010 | Atsumi et al. |
| 2010/0009547 A1 | 1/2010 | Sakamoto |
| 2010/0012632 A1 | 1/2010 | Sakamoto |
| 2010/0012633 A1 | 1/2010 | Atsumi et al. |
| 2010/0015783 A1 | 1/2010 | Fukuyo et al. |
| 2010/0032418 A1 | 2/2010 | Kuno et al. |
| 2010/0055876 A1 | 3/2010 | Fukuyo et al. |
| 2010/0151202 A1 | 6/2010 | Fukumitsu |
| 2010/0176100 A1 | 7/2010 | Fukuyo et al. |
| 2010/0184271 A1 | 7/2010 | Sugiura et al. |
| 2010/0200550 A1 | 8/2010 | Kumagai |
| 2010/0203678 A1 | 8/2010 | Fukumitsu et al. |
| 2010/0203707 A1 | 8/2010 | Fujii et al. |
| 2010/0227453 A1 | 9/2010 | Sakamoto |
| 2010/0240159 A1 | 9/2010 | Kumagai et al. |
| 2010/0258539 A1 | 10/2010 | Sakamoto |
| 2010/0301521 A1 | 12/2010 | Uchiyama |
| 2010/0311313 A1 | 12/2010 | Uchiyama |
| 2010/0327416 A1 | 12/2010 | Fukumitsu |
| 2011/0000897 A1 | 1/2011 | Nakano et al. |
| 2011/0001220 A1 | 1/2011 | Sugiura et al. |
| 2011/0021004 A1 | 1/2011 | Fukuyo et al. |
| 2011/0027971 A1 | 2/2011 | Fukuyo et al. |
| 2011/0027972 A1 | 2/2011 | Fukuyo et al. |
| 2011/0037149 A1 | 2/2011 | Fukuyo et al. |
| 2011/0274128 A1 | 11/2011 | Fukumitsu et al. |

FOREIGN PATENT DOCUMENTS

| | | | |
|---|---|---|---|
| JP | 2003-66375 | 3/2003 | |
| JP | P 2003-126982 A * | 5/2003 | ............ B23K 26/06 |
| JP | 2004-343008 | 12/2004 | |
| JP | 2005-109323 | 4/2005 | |
| JP | 2006-187782 | 7/2006 | |
| JP | 2006-205260 | 8/2006 | |

OTHER PUBLICATIONS

U.S. Appl. No. 13/269,274, filed Oct. 7, 2011.
U.S. Appl. No. 13/235,936, filed Sep. 19, 2011.
U.S. Appl. No. 13/213,175, filed Aug. 19, 2011.
U.S. Appl. No. 13/233,662, filed Sep. 15, 2011.
U.S. Appl. No. 13/061,438, filed Apr. 26, 2011.
U.S. Appl. No. 13/107,056, filed May 13, 2011.
U.S. Appl. No. 13/151,877, filed Jun. 2, 2011.
U.S. Appl. No. 13/131,429, filed Jun. 28, 2011.
U.S. Appl. No. 13/143,636, filed Sep. 21, 2011.
U.S. Appl. No. 13/148,097, filed Aug. 26, 2011.
U.S. Appl. No. 13/262,995, filed Oct. 5, 2011.
U.S. Appl. No. 13/265,027, filed Oct. 18, 2011.
X. Liu et al., "Laser Ablation and Micromachining with Ultrashort Laser Pulses," IEEE Journal of Quantum Electronics, vol. 33, No. 10, Oct. 1997, pp. 1706-1716.

* cited by examiner (a)

(b)

(c)

(a)

(b)

(c)

LASER PROCESSING DEVICE

TECHNICAL FIELD

The present invention relates to a laser processing apparatus for cutting a planar object to be processed along a line to cut.

BACKGROUND ART

Known as a conventional laser processing apparatus is one which irradiates a planar object to be processed with processing laser light while locating a converging point within the object, so as to form a modified region to become a cutting start point within the object along a line to cut the object (see, for example, Patent Literature 1).
Patent Literature 1: Japanese Patent Application Laid-Open No. 2004-343008

DISCLOSURE OF INVENTION

Technical Problem

Meanwhile, the following is necessary for a laser processing apparatus such as the one mentioned above to cut a relatively thick object to be processed having a thickness of 100 μm or more, for example. That is, for forming a modified region accurately at a predetermined position distanced from a laser light irradiation surface of the object, it is necessary to emit (trace) measuring laser light for measuring a displacement of the laser light irradiation surface along the line to cut before forming the modified region by irradiation with the processing laser light. Further, for accurately cutting the object, a plurality of rows of modified regions are required to be formed in the thickness direction of the object, which makes it necessary to scan the processing laser light along the same line to cut a plurality of times according to the number of rows of modified regions. Therefore, it may take a long time for the laser processing apparatus such as the one mentioned above to form the modified regions within the object, thereby increasing the running cost.

It is therefore an object of the present invention to provide a laser processing apparatus which can shorten the time required for forming a modified region within an object to be processed.

Solution to Problem

For achieving the above-mentioned object, in one aspect, the laser processing apparatus in accordance with the present invention is a laser processing apparatus for irradiating a planar object to be processed with processing laser light while locating a converging point within the object, so as to form a modified region to become a cutting start point within the object along a line to cut the object, the apparatus comprising a mount table for mounting the object; a processing laser light source for emitting the processing laser light as linearly polarized light; a measuring laser light source for emitting measuring laser light for irradiating the object; a first half-wave plate for changing a polarization direction of the processing laser light emitted from the processing laser light source; a polarizing plate for splitting the processing laser light transmitted through the first half-wave plate into a processing laser light component having a polarization direction in a predetermined direction and a processing laser light component having a polarization direction in a direction intersecting the predetermined direction; a second half-wave plate for changing the polarization direction of the processing laser light component, split by the polarizing plate, having the polarization direction in the direction intersecting the predetermined direction into the predetermined direction; a first converging lens for converging the processing laser light component, split by the polarizing plate, having the polarization direction in the predetermined direction and the measuring laser light emitted from the measuring laser light source toward the object; a second converging lens, arranged in parallel with the first converging lens along the predetermined direction, for converging the processing laser light component, transmitted through the second half-wave plate, having the polarization direction in the predetermined direction toward the object; control means for detecting a reflected light component of the measuring laser light reflected by a laser light irradiation surface irradiated with the measuring laser light in the object so as to regulate a distance between the laser light irradiation surface and the second converging lens such that a converging point of the processing laser light converged by the second converging lens is located at a predetermined position with reference to the laser light irradiation surface; and moving means for relatively moving at least one of a pair of the first and second converging lenses and the mount table along the line to cut in a state where the predetermined direction substantially coincides with the line to cut.

In another aspect, the laser processing apparatus in accordance with the present invention is a laser processing apparatus for irradiating a planar object to be processed with processing laser light while locating a converging point within the object, so as to form a modified region to become a cutting start point within the object along a line to cut the object, the apparatus comprising a mount table for mounting the object; a processing laser light source for emitting the processing laser light as linearly polarized light; a measuring laser light source for emitting measuring laser light for irradiating the object; a first half-wave plate for changing a polarization direction of the processing laser light emitted from the processing laser light source; a polarizing plate for splitting the processing laser light transmitted through the first half-wave plate into a processing laser light component having a polarization direction in a predetermined direction and a processing laser light component having a polarization direction in a direction intersecting the predetermined direction; a second half-wave plate for changing the polarization direction of the processing laser light component, split by the polarizing plate, having the polarization direction in the direction intersecting the predetermined direction into the predetermined direction; a first converging lens for converging the processing laser light component, transmitted through the second half-wave plate, having the polarization direction in the predetermined direction and the measuring laser light emitted from the measuring laser light source toward the object; a second converging lens, arranged in parallel with the first converging lens along the predetermined direction, for converging the processing laser light component, split by the polarizing plate, having the polarization direction in the predetermined direction toward the object; control means for detecting a reflected light component of the measuring laser light reflected by a laser light irradiation surface irradiated with the measuring laser light in the object so as to regulate a distance between the laser light irradiation surface and the second converging lens such that a converging point of the processing laser light converged by the second converging lens is located at a predetermined position with reference to the laser light irradiation surface; and moving means for relatively moving at least one of a pair of the first and second converging lenses and the mount table along the line to cut in a state where the predetermined direction substantially coincides with the line to cut.

In the laser processing apparatus in accordance with the present invention, linearly polarized processing laser light is emitted from a processing laser light source, changes the polarization direction with a first half-wave plate, and then is incident on a polarizing plate. The polarizing plate splits the processing laser light into a processing light component having a polarization direction in a predetermined direction and a processing light component having a polarization direction in a direction intersecting the predetermined direction. The processing laser light component, split by the polarizing plate, having the polarization direction in the direction intersecting the predetermined direction changes the polarization direction to the predetermined direction because of a second half-wave plate. In other words, the linearly polarized processing laser light is split into respective components incident on the first and second converging lenses, while having the converging direction in the predetermined direction. Then, in this case, as at least one of the pair of first and second converging lenses and the mount table is relatively moved by the moving means along the line to cut in a state where the predetermined direction substantially coincides with the line to cut, for example, the measuring laser light is emitted from the measuring laser light source, and control means detects a reflected light component of the measuring laser light reflected by the laser light irradiation surface of the object, whereby the distance between the laser light irradiation surface and the second converging lens is regulated such that a converging point of the processing laser light converged by the second converging lens is located at a predetermined position with reference to the laser light irradiation surface. These make it possible to measure the displacement of the laser light irradiation surface with the measuring laser light and form the modified region with the processing laser light at the same time, whereby pretracing is unnecessary even when the object is relatively thick. This can shorten the time required for forming the modified region within the object.

Preferably, the control means detects the reflected light component of the measuring laser light reflected by the laser light irradiation surface so as to regulate a distance between the laser light irradiation surface and the first converging lens such that a converging point of the processing laser light converged by the first converging lens is located at a predetermined position with reference to the laser light irradiation surface. In this case, as at least one of the pair of first and second converging lenses and the mount table is relatively moved by the moving means along the line to cut in a state where the predetermined direction substantially coincides with the line to cut, for example, the measuring laser light is emitted from the measuring laser light source, and the control means detects a reflected light component of the measuring laser light reflected by the laser light irradiation surface of the object, whereby the distance between the laser light irradiation surface and the first converging lens is regulated such that a converging point of the processing laser light converged by the first converging lens is located at a predetermined position with reference to the laser light irradiation surface, while the distance between the laser light irradiation surface and the second converging lens is regulated such that a converging point of the processing laser light converged by the second converging lens is located at a predetermined position with reference to the laser light irradiation surface. Therefore, at least two rows of modified regions can simultaneously be formed within the object. As a result, when forming a plurality of rows of modified regions in the thickness direction of the object, the number of repeating scans of the processing laser light along the same line to cut can be reduced.

Preferably, the first half-wave plate changes the polarization direction of the processing laser light to a given direction. In this case, portions of light quantities of the processing laser light components split by the polarizing plate can be adjusted arbitrarily according to the polarization direction of the processing laser light transmitted through the first half-wave plate.

Preferably, the apparatus further comprises an attenuator, arranged between the processing laser light source and the first half-wave plate in an optical path of the processing laser light, for adjusting a light quantity of the processing laser light. In this case, the attenuator can adjust the light quantity of the processing laser light incident on the first half-wave plate, so as to change the total output of the processing laser light freely.

Preferably, the apparatus further comprises a shutter, arranged between the polarizing plate and the first converging lens in an optical path of the processing laser light, for blocking the processing laser light from being made incident on the first converging lens. In this case, closing the shutter can reliably and easily inhibit the first converging lens from converging the processing laser light toward the object. This is effective in particular when only the displacement measurement for the laser light irradiation surface with the first converging lens is carried out by using the first converging lens.

There is also a case where the second converging lens is arranged in parallel with the first converging lens while being separated therefrom by a predetermined distance, and the control means executes control for operating the first converging lens such that the first converging lens is separated from the laser light irradiation surface by a constant distance and, while acquiring operation information concerning the operation, operating the second convergent lens according to the operation information and the predetermined distance, and control for operating the first converging lens according to the operation information acquired beforehand and operating the second converging lens according to the operation information acquired beforehand and the predetermined distance.

Advantageous Effects of Invention

The present invention makes it possible to provide a laser processing apparatus which can shorten the time required for forming a modified region within an object to be processed.

REFERENCE SIGNS LIST

1 . . . object to be processed; 3 . . . front face (laser light entrance surface); 5 . . . line to cut; 7 . . . modified region; 31 . . . converging lens (first converging lens); 32 . . . converging lens (second converging lens); 33, 34 . . . shutter; 41 . . . measuring laser light source; 42 . . . quadrant photodiode (displacement acquiring means); 51 . . . half-wave plate (first wave plate); 52 . . . polarizing plate; 55 . . . half-wave plate (second wave plate); 101 . . . processing laser light source; 102 . . . attenuator; 105 . . . converging lens control section (control means); 107 . . . mount table; 115 . . . movement control section (moving means); L, L1, L2 . . . processing laser light; L3 . . . measuring laser light; L4 . . . reflected light; P . . . converging point

DESCRIPTION OF EMBODIMENTS

In the following, a preferred embodiment of the present invention will be explained in detail with reference to the drawings. In the laser processing method in accordance with the embodiment, a phenomenon known as multiphoton absorption is used for forming a modified region within an object to be processed. Therefore, to begin with, a laser processing method for forming a modified region by the multiphoton absorption will be explained.

A material becomes transparent when its absorption bandgap $E_G$ is greater than photon energy hv. Consequently, a condition under which absorption occurs in the material is $hv > E_G$. However, even when optically transparent, the material generates absorption under a condition of $nhv > E_G$ (where $n = 2, 3, 4, \ldots$) if the intensity of laser light becomes very high. This phenomenon is known as multiphoton absorption. In the case of pulsed waves, the intensity of laser light is determined by the peak power density (W/cm$^2$) of laser light at its converging point. The multiphoton absorption occurs under a condition where the peak power density is $1 \times 10^8$ (W/cm$^2$) or greater, for example. The peak power density is determined by (energy of laser light at the converging point per pulse)/(beam spot cross-sectional area of laser light×pulse width). In the case of continuous waves, the intensity of laser light is determined by the field intensity (W/cm$^2$) of laser light at the converging point.

Figure 1:
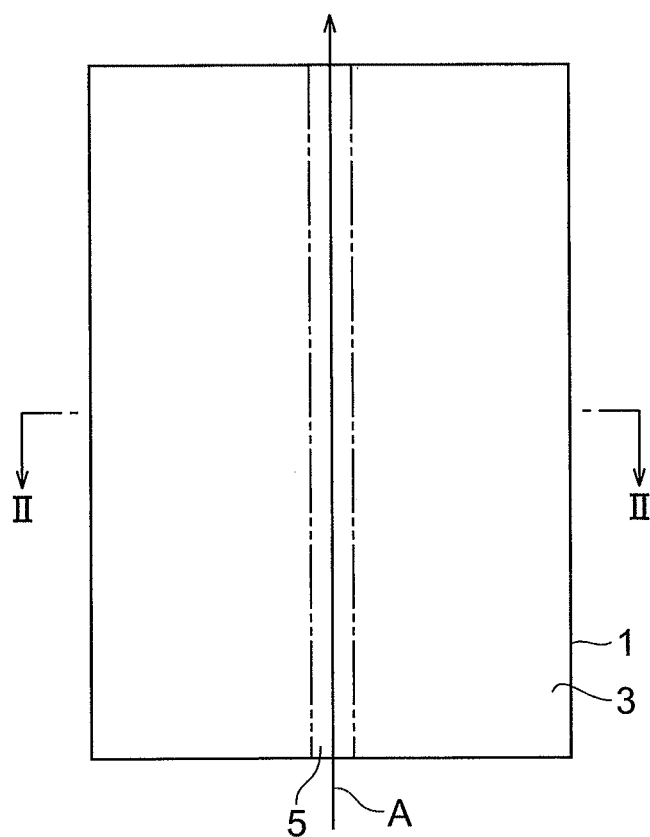
FIG. 1 is a plan view of an object to be processed during laser processing by the laser processing apparatus in accordance with an embodiment.
Figure 2:
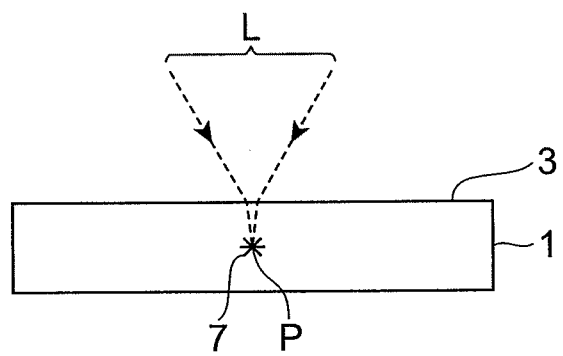
FIG. 2 is a sectional view of the object taken along the line II-II of FIG. 1.

The principle of the laser processing method in accordance with the embodiment using such multiphoton absorption will be explained with reference to FIGS. 1 to 6. As illustrated in FIG. 1, on a front face 3 of a wafer-like (planar) object to be processed 1, a line to cut 5 for cutting the object 1 exists. The line to cut 5 is a virtual line extending straight. As illustrated in FIG. 2, the laser processing method in accordance with this embodiment irradiates the object 1 with laser light L while locating a converging point P therewithin under a condition generating multiphoton absorption, so as to form a modified region 7. The converging point P is a position at which the laser light L is converged. The line to cut 5 may be curved instead of being straight, and may be a line actually drawn on the object 1 without being restricted to the virtual line.

Figure 3:
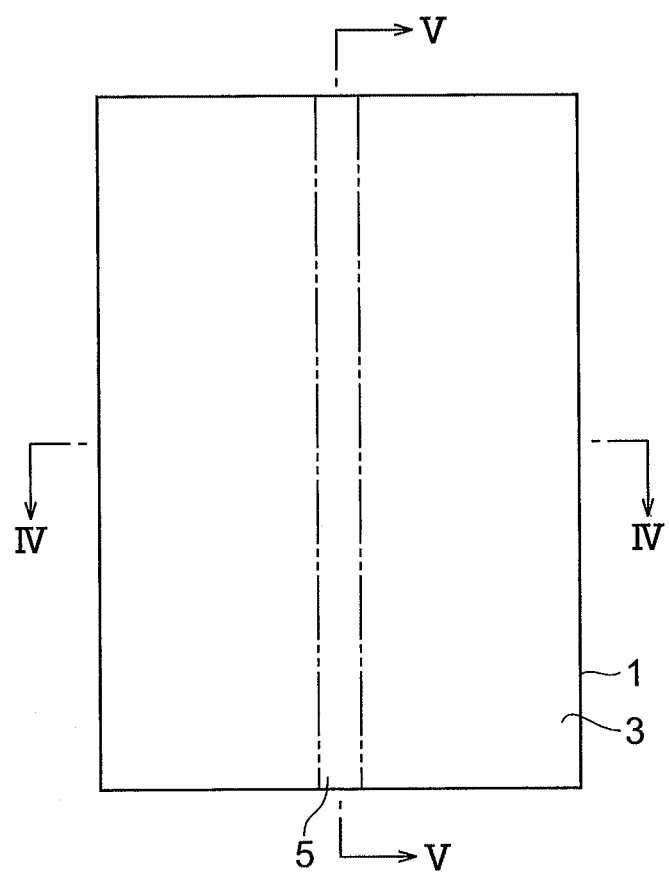
FIG. 3 is a plan view of the object after laser processing by the laser processing apparatus in accordance with the embodiment.
Figure 4:
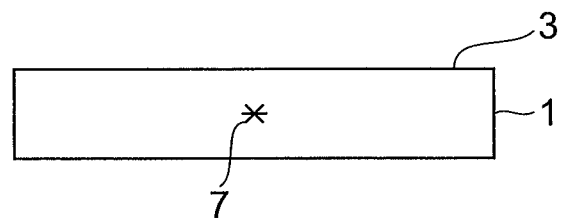
FIG. 4 is a sectional view of the object taken along the line IV-IV of FIG. 3.
Figure 5:
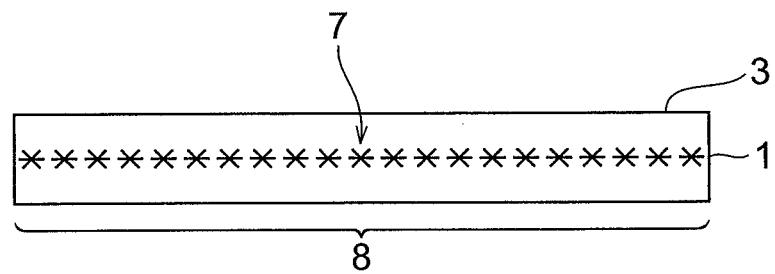
FIG. 5 is a sectional view of the object taken along the line V-V of FIG. 3.

Then, the laser light L is relatively moved along the line to cut 5 (i.e., in the direction of arrow A in FIG. 1), so as to shift the converging point P along the line to cut 5. Consequently, as illustrated in FIGS. 3 to 5, the modified region 7 is formed along the line to cut 5 within the object 1, and becomes a cutting start region 8. The cutting start region 8 refers to a region which becomes a start point for cutting (fracturing) when the object 1 is cut. The cutting start region 8 may be made by forming the modified region 7 either continuously or intermittently.

In the laser processing method in accordance with this embodiment, the front face 3 of the object 1 hardly absorbs the laser light L and thus does not melt.

Figure 6:
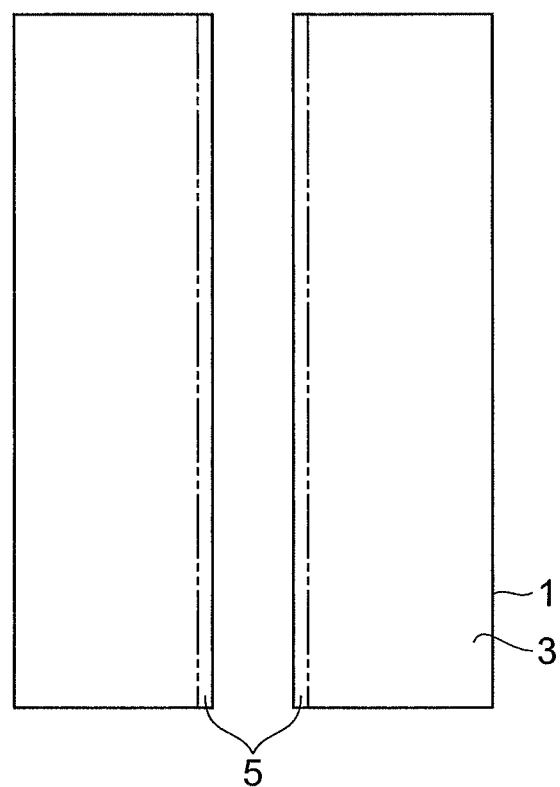
FIG. 6 is a plan view of the object cut by the laser processing apparatus in accordance with the embodiment.

Forming the cutting start region 8 within the object 1 makes it easier to generate fractures from the cutting start region 8 acting as a start point, whereby the object 1 can be cut with a relatively small force as illustrated in FIG. 6. Therefore, the object 1 can be cut with a high precision without generating unnecessary fractures on the front face 3 of the object 1.

There seem to be the following two ways of cutting the object 1 from the cutting start region 8 acting as a start point. One is where an artificial force is applied to the object 1 after the cutting start region 8 is formed, so that the object 1 fractures from the cutting start region 8 acting as a start point, whereby the object 1 is cut. This is the cutting in the case where the object 1 has a large thickness, for example. Applying an artificial force refers to exerting a bending stress or shear stress to the object 1 along the cutting start region 8, or generating a thermal stress by applying a temperature difference to the object 1, for example. The other is where the forming of the cutting start region 8 causes the object 1 to fracture naturally in its cross-sectional direction (thickness direction) from the cutting start region 8 acting as a start point, thereby cutting the object 1. This becomes possible if the cutting start region 8 is formed by one row of the modified region 7 when the object 1 has a small thickness, or if the cutting start region 8 is formed by a plurality of rows of the modified region 7 in the thickness direction when the object 1 has a large thickness. Even in this naturally fracturing case, fractures do not extend onto the front face 3 at a portion corresponding to an area not formed with the cutting start region 8 in the part to cut, so that only the portion corresponding to the area formed with the cutting start region 8 can be cleaved, whereby cleavage can be controlled well. Such a cleaving method with a favorable controllability is very effective, since the object 1 to be processed such as a silicon wafer has recently been apt to decrease its thickness.

The modified region formed by multiphoton absorption in the laser processing method in accordance with this embodiment encompasses the following cases (1) to (3):

(1) Case where the modified region is a crack region including one or a plurality of cracks An object to be processed (e.g., glass or a piezoelectric material made of $LiTaO_3$) is irradiated with laser light while locating a converging point therewithin under a condition with a field intensity of at least $1 \times 10^8$ (W/cm$^2$) at the converging point and a pulse width of 1 μs or less. This magnitude of pulse width is a condition under which a crack region can be formed only within the object while generating multiphoton absorption without causing unnecessary damages to the front face of the object. This generates a phenomenon of optical damage by multiphoton absorption within the object. This optical damage induces a thermal distortion within the object, thereby forming a crack region therewithin. The upper limit of field intensity is $1 \times 10^{12}$ (W/cm$^2$), for example. The pulse width is preferably 1 ns to 200 ns, for example. The forming of a crack region by multiphoton absorption is disclosed, for example, in "Internal Marking of Glass Substrate with Solid-state Laser", Proceedings of the 45th Laser Materials Processing Conference (December, 1998), pp. 23-28.

The inventors determined the relationship between field intensity and crack size by an experiment. The following are conditions of the experiment.

(A) Object to be processed: Pyrex (registered trademark) glass (with a thickness of 700 μm)

(B) Laser

Light source: semiconductor laser pumping Nd:YAG laser

Wavelength: 1064 m

Laser light spot cross-sectional area: $3.14 \times 10^{-8}$ cm$^2$

Oscillation mode: Q-switched pulse

Repetition frequency: 100 kHz

Pulse width: 30 ns

Output: output<1 mJ/pulse

Laser light quality: $TEM_{00}$

Polarizing property: linear polarization (C) Converging lens

Transmittance at a laser light wavelength: 60%

(D) Moving rate of the mount table mounting the object: 100 mm/sec

The laser light quality of $TEMO_{00}$ means that the converging characteristic is so high that convergence to about the wavelength of laser light is possible.

Figure 7:
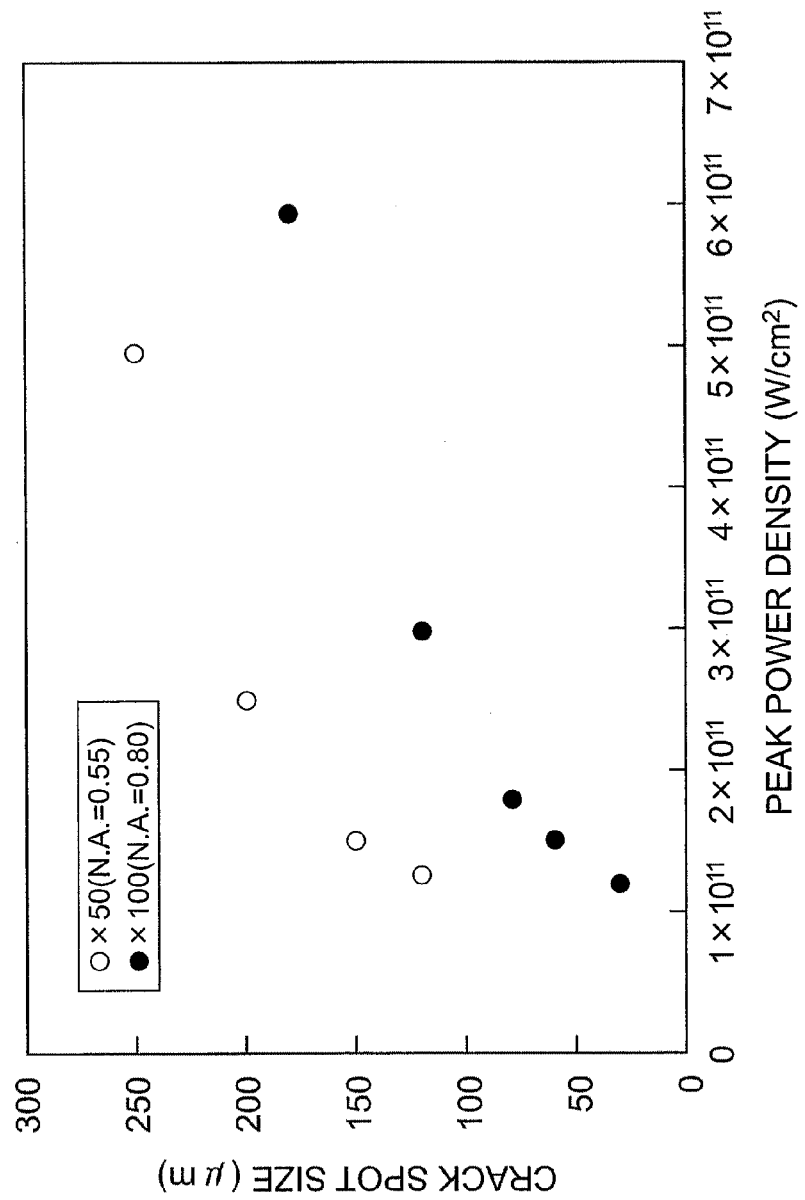
FIG. 7 is a graph illustrating relationships between the field intensity and crack spot size in the laser processing apparatus in accordance with the embodiment.

FIG. 7 is a graph illustrating the results of the above-mentioned experiment. The abscissa indicates the peak power density. Since the laser light is pulsed laser light, the field intensity is represented by the peak power density. The ordinate indicates the size of a crack part (crack spot) formed within the object by one pulse of laser light. Crack spots gather to yield a crack region. The crack spot size is the size of a part yielding the maximum length among forms of crack spots. Data represented by black circles in the graph refer to a case where the converging lens (C) has a magnification of ×100 and a numerical aperture (NA) of 0.80. On the other hand, data represented by whitened circles in the graph refer to a case where the converging lens (C) has a magnification of ×50 and a numerical aperture (NA) of 0.55. Crack spots are seen to occur within the object from when the peak power density is about $10^{11}$ (W/cm$^2$) and become greater as the peak power density increases.

Figure 8:
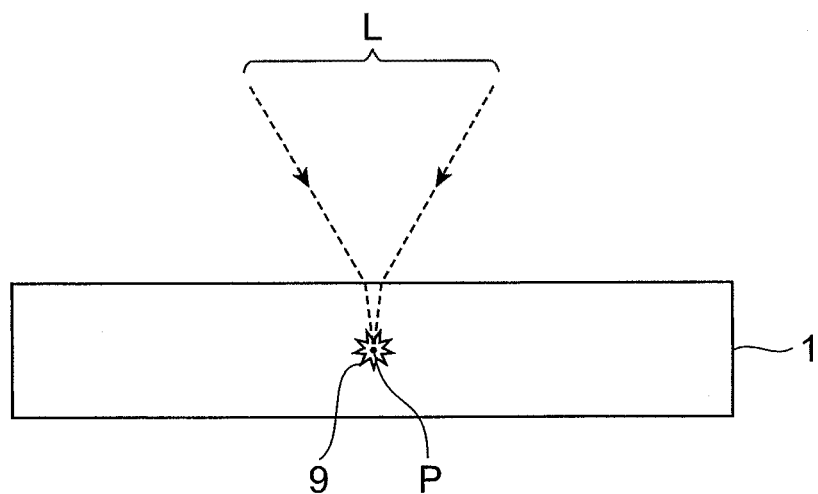
FIG. 8 is a sectional view of the object in a first step of the laser processing apparatus in accordance with the embodiment.
Figure 9:
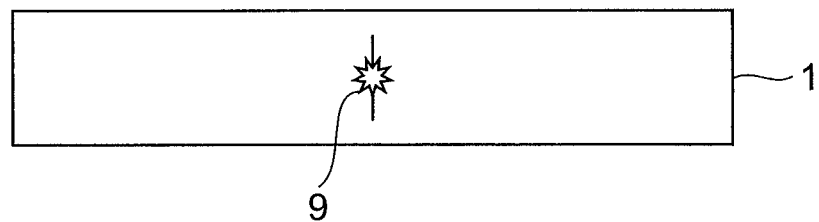
FIG. 9 is a sectional view of the object in a second step of the laser processing apparatus in accordance with the embodiment.
Figure 10:
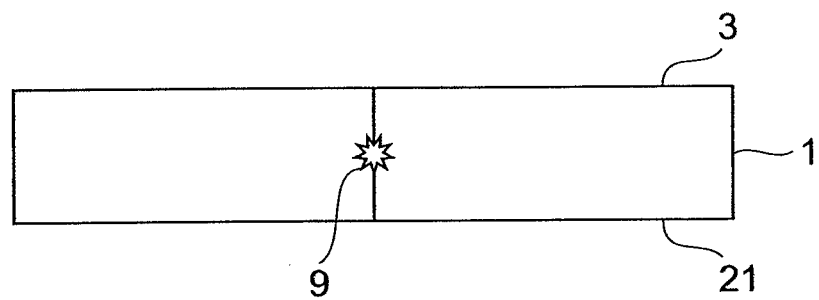
FIG. 10 is a sectional view of the object in a third step of the laser processing apparatus in accordance with the embodiment.
Figure 11:
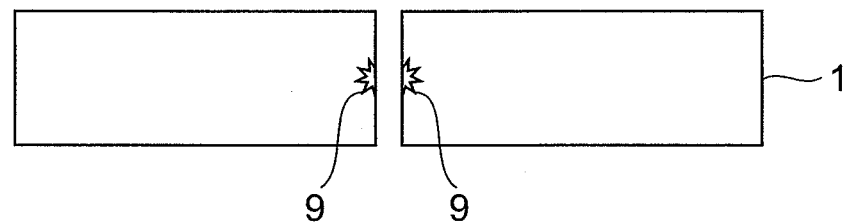
FIG. 11 is a sectional view of the object in a fourth step of the laser processing apparatus in accordance with the embodiment.

A mechanism by which the object to be processed is cut by forming a crack region will now be explained with reference to FIGS. 8 to 11. As illustrated in FIG. 8, the object 1 is irradiated with laser light L while the converging point P is located within the object 1 under a condition where multiphoton absorption occurs, so as to form a crack region 9 therewithin along a line to cut. The crack region 9 is a region containing one or a plurality of cracks. Thus formed crack region 9 becomes a cutting start region. A crack further grows from the crack region 9 acting as a start point (i.e., from the cutting start region acting as a start point) as illustrated in FIG. 9, and reaches the front face 3 and rear face 21 of the object 1 as illustrated in FIG. 10, whereby the object 1 fractures and is consequently cut as illustrated in FIG. 11. The crack reaching the front face 3 and rear face 21 of the object 1 may grow naturally or as a force is applied to the object 1.

(2) Case where the modified region is a molten processed region

An object to be processed (e.g., semiconductor material such as silicon) is irradiated with laser light while locating a converging point within the object under a condition with a field intensity of at least $1 \times 10^8$ (W/cm$^2$) at the converging point and a pulse width of 1 μs or less. As a consequence, the inside of the object is locally heated by multiphoton absorption. This heating forms a molten processed region within the object. The molten processed region encompasses regions once molten and then re-solidified, regions just in a molten state, and regions in the process of being re-solidified from the molten state, and can also be referred to as a region whose phase has changed or a region whose crystal structure has changed. The molten processed region may also be referred to as a region in which a certain structure changes to another structure among monocrystal, amorphous, and polycrystal structures. For example, it means a region having changed from the monocrystal structure to the amorphous structure, a region having changed from the monocrystal structure to the polycrystal structure, or a region having changed from the monocrystal structure to a structure containing amorphous and polycrystal structures. When the object to be processed is of a silicon monocrystal structure, the molten processed region is an amorphous silicon structure, for example. The upper limit of field intensity is $1 \times 10^{12}$ (W/cm$^2$), for example. The pulse width is preferably 1 ns to 200 ns, for example.

By an experiment, the inventors verified that a molten processed region was formed within a silicon wafer (semiconductor substrate). The following are conditions of the experiment.

(A) Object to be processed: silicon wafer (with a thickness of 350 μm and an outer diameter of 4 inches)

(B) Laser

Light source: semiconductor laser pumping Nd:YAG laser

Wavelength: 1064 nm

Laser light spot cross-sectional area: $3.14 \times 10^{-8}$ cm$^2$

Oscillation mode: Q-switched pulse

Repetition frequency: 100 kHz

Pulse width: 30 ns

Output: 20 μJ/pulse

Laser light quality: $TEM_{00}$

Polarizing property: linear polarization (C) Converging lens

Magnification: ×50

N.A.: 0.55

Transmittance at a laser light wavelength: 60%

(D) Moving rate of the mount table mounting the object: 100 mm/sec

Figure 12:
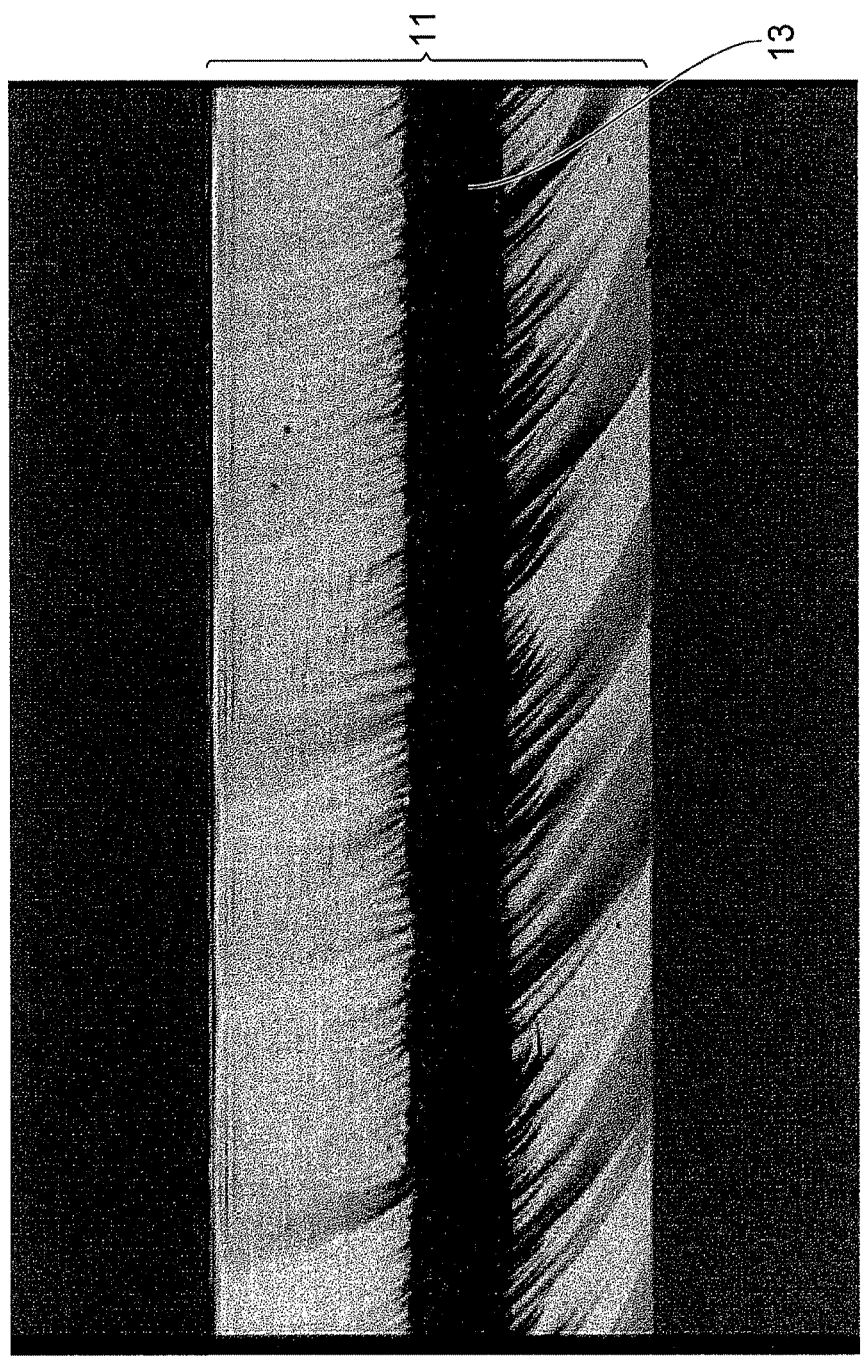
FIG. 12 is a view illustrating a photograph of a cut section in a part of a silicon wafer cut by the laser processing apparatus in accordance with the embodiment.

FIG. 12 is a view illustrating a photograph of a cross section of a part of a silicon wafer cut by laser processing under the conditions mentioned above. A molten processed region 13 is formed within the silicon wafer 11. The molten processed region 13 formed under the above-mentioned conditions has a size of about 100 μm in the thickness direction.

Figure 13:
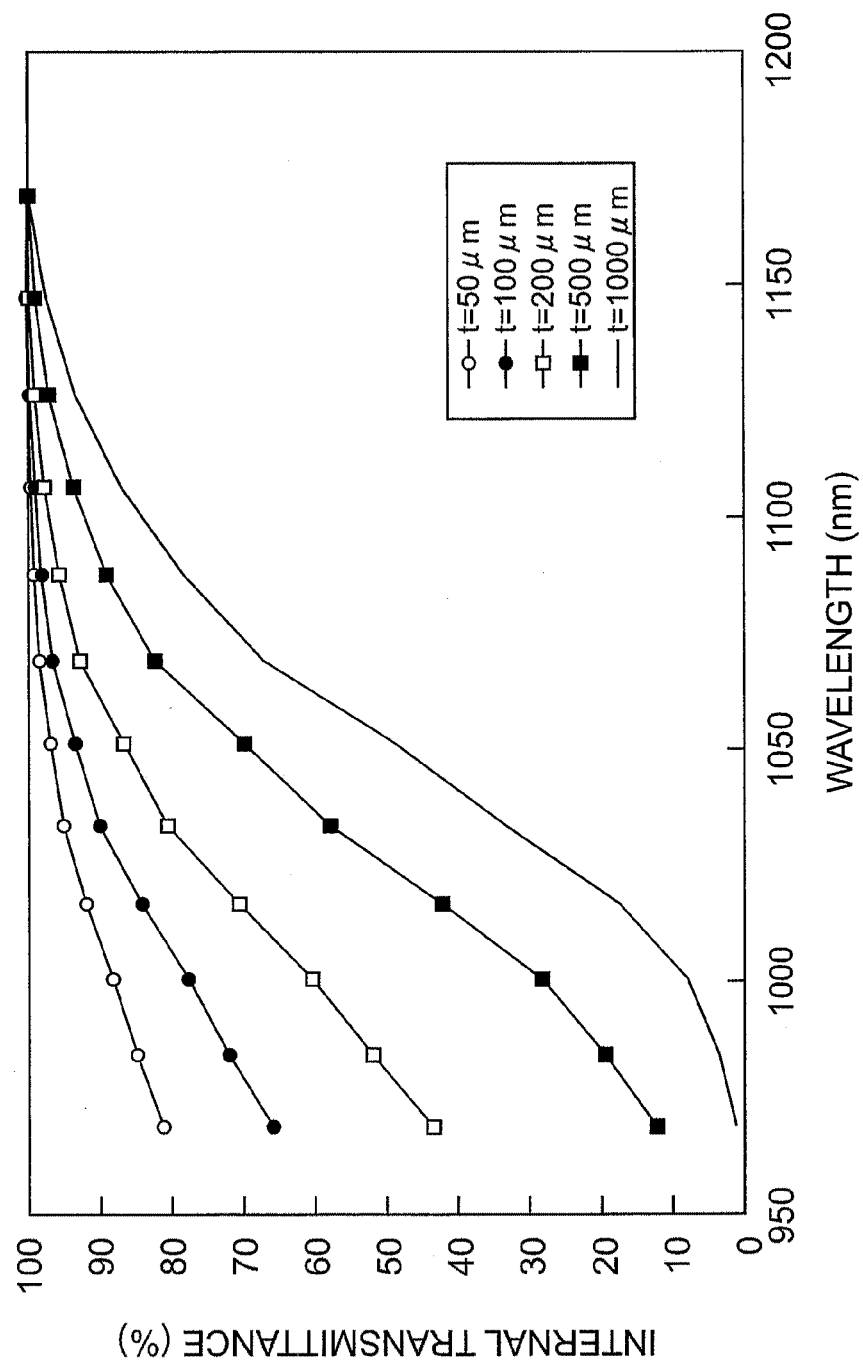
FIG. 13 is a graph illustrating relationships between the laser light wavelength and the transmittance within a silicon substrate in the laser processing apparatus in accordance with the embodiment.

The fact that the molten processed region 13 is formed by multiphoton absorption will now be explained. FIG. 13 is a graph illustrating relationships between the laser light wavelength and the transmittance within the silicon substrate. Here, the respective reflected components on the front and rear sides of the silicon substrate are eliminated, so as to represent the internal transmittance alone. The respective relationships are illustrated in the cases where the thickness t of the silicon substrate is 50 μm, 100 μm, 200 μm, 500 μm, and 1000 μm.

For example, at the Nd:YAG laser wavelength of 1064 nm, the laser light appears to be transmitted through the silicon substrate by at least 80% when the silicon substrate has a thickness of 500 μm or less. Since the silicon wafer 11 illustrated in FIG. 12 has a thickness of 350 μm, the molten processed region 13 caused by multiphoton absorption is formed near the center of the silicon wafer 11, i.e., at a part distanced from the front face by 175 μm. The transmittance in this case is 90% or more with reference to a silicon wafer having a thickness of 200 μm, whereby the laser light is absorbed only slightly within the silicon wafer 11 but is substantially transmitted therethrough. This means that the molten processed region 13 is formed within the silicon wafer 11 not by the absorption of laser light within the silicon wafer 11 (i.e., not by usual heating with the laser light) but by multiphoton absorption. The forming of a molten processed region by multiphoton absorption is disclosed, for example, in "Ultrashort Pulse Laser Microprocessing of Silicon", Preprints of the National Meetings of Japan Welding Society, Vol. 66 (April, 2000), pp. 72-73.

A fracture is generated in a silicon wafer from a cutting start region formed by a molten processed region, acting as a start point, in a cross-sectional direction, and reaches the front and rear faces of the silicon wafer, whereby the silicon wafer is cut. The fracture reaching the front and rear faces of the silicon wafer may grow naturally or as a force is applied to the silicon wafer. The fracture naturally growing from the cutting start region to the front and rear faces of the silicon wafer encompasses a case where the fracture grows from a state in which the molten processed region forming the cutting start region is molten and a case where the fracture grows when the molten processed region forming the cutting start region is re-solidified from the molten state. In either case, the molten processed region is formed only within the silicon wafer, and thus is present only within the cut section after cutting as illustrated in FIG. 12. When a cutting start region is thus formed within the object by a molten processed region, unnecessary fractures deviating from a cutting start region line are harder to occur at the time of cleaving, whereby cleavage control becomes easier. Here, the molten processed region may be formed not only by multiphoton absorption but also by other absorption actions.

(3) Case where the modified region is a refractive index change region

An object to be processed (e.g., glass) is irradiated with laser light while locating a converging point within the object under a condition with a field intensity of at least $1 \times 10^8$ (W/cm$^2$) at the converging point and a pulse width of 1 ns or less. When multiphoton absorption is generated within the object with a very short pulse width, the energy caused by multiphoton absorption is not converted into thermal energy, whereby an eternal structure change such as ion valence change, crystallization, or orientation polarization is induced within the object, thus forming a refractive index change region. The upper limit of field intensity is $1 \times 10^{12}$ (W/cm$^2$), for example. The pulse width is preferably 1 ns or less, for example, more preferably 1 ps or less. The forming of a refractive index change region by multiphoton absorption is disclosed, for example, in "Forming of Photoinduced Structure within Glass by Femtosecond Laser Irradiation", Proceedings of the 42nd Laser Materials Processing Conference (November, 1997), pp. 105-111.

Though the cases (1) to (3) are explained in the foregoing as a modified region formed by multiphoton absorption, a cutting start region may be formed as follows while taking account of the crystal structure of a wafer-like object to be processed, its cleavage characteristic, and the like, whereby the object can be cut with a favorable precision by a smaller force from the cutting start region acting as a start point.

That is, in the case of a substrate made of a monocrystal semiconductor having a diamond structure such as silicon, it will be preferred if a cutting start region is formed in a direction extending along a (111) plane (first cleavage plane) or a (110) plane (second cleavage plane). In the case of a substrate made of a group III-V compound semiconductor of sphalerite structure such as GaAs, it will be preferred if a cutting start region is formed in a direction extending along a (110) plane. In the case of a substrate having a crystal structure of hexagonal system such as sapphire ($Al_2O_3$), it will be preferred if a cutting start region is formed in a direction extending along a (1120) plane (A plane) or a (1100) plane (M plane) while using a (0001) plane (C plane) as a principal plane.

When the substrate is formed with an orientation flat in a direction to be formed with the above-mentioned cutting start region (e.g., a direction extending along a (111) plane in a monocrystal silicon substrate) or a direction orthogonal to the former direction, the cutting start region extending in the direction to be formed with the cutting start region can be formed easily and accurately with reference to the orientation flat.

The preferred embodiment of the present invention will now be explained.

Figure 14:
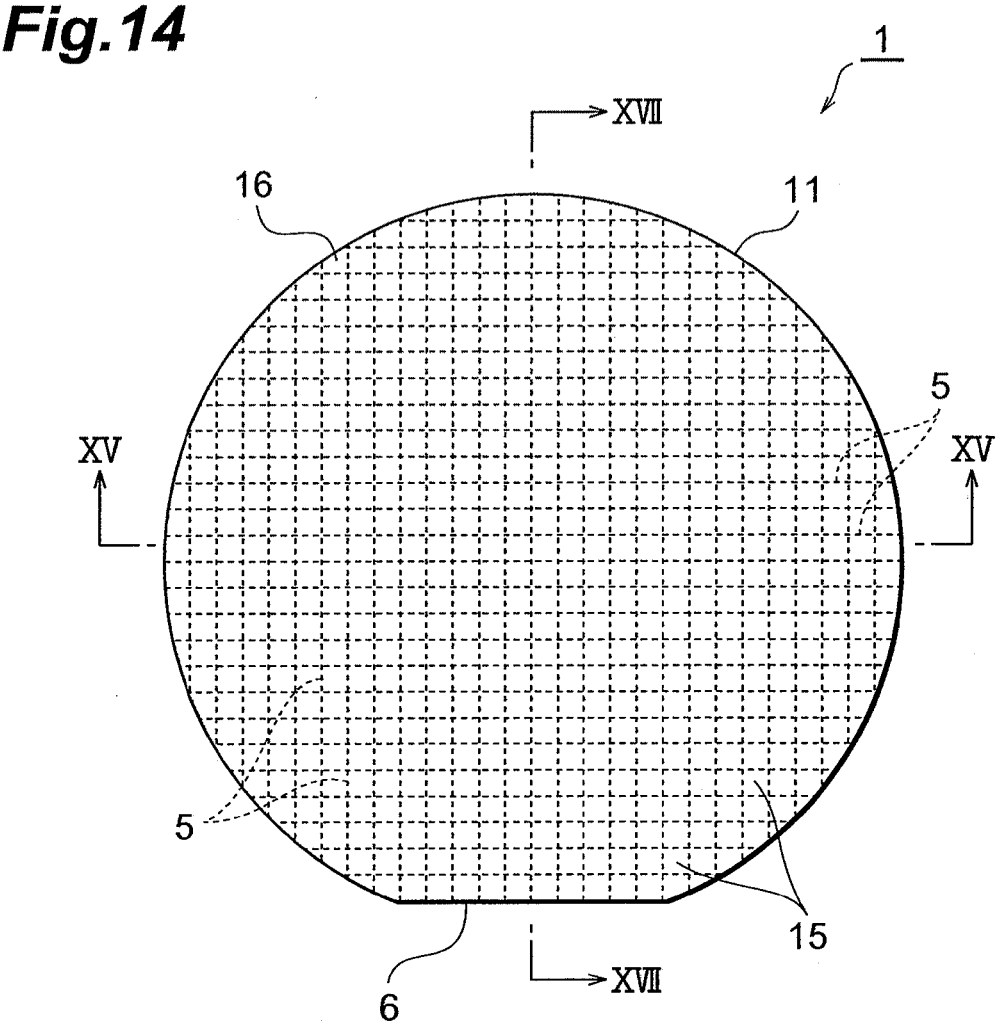
FIG. 14 is a front view illustrating an object to be processed.
Figure 15:
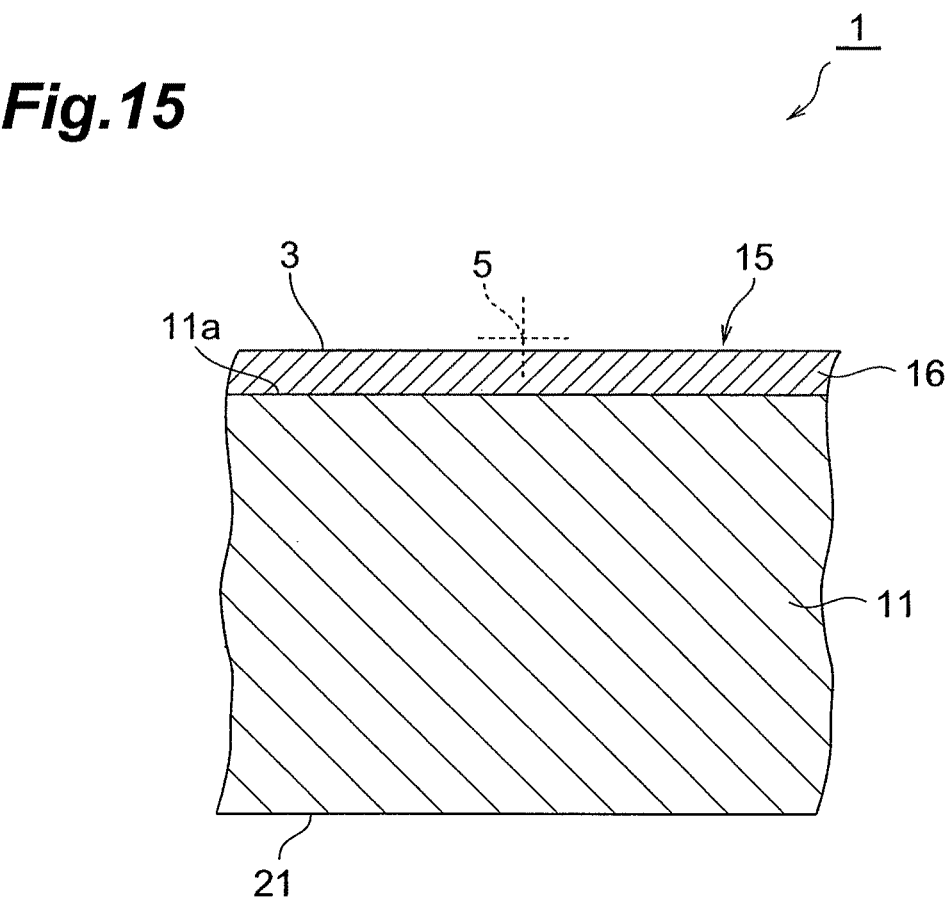
FIG. 15 is a partial sectional view taken along the line XV-XV of FIG. 14.

As illustrated in FIGS. 14 and 15, an object to be processed 1 comprises a silicon wafer 11 having a thickness of 300 μm and a diameter of 8 inches and a functional device layer 16 which is formed on a front face 11a of the silicon wafer 11 while including a plurality of functional devices 15.

A number of functional devices 15, examples of which include semiconductor operating layers formed by crystal growth, light-receiving devices such as photodiodes, light-emitting devices such as laser diodes, and circuit devices formed as circuits, are formed like a matrix in directions parallel and perpendicular to an orientation flat 6 of the silicon wafer 11. Such an object to be processed 1 is cut along lines to cut 5 which are set like grids passing between the functional devices adjacent to each other, so as to become chips each having a size of 1 mm×1 mm, for example.

Figure 16:
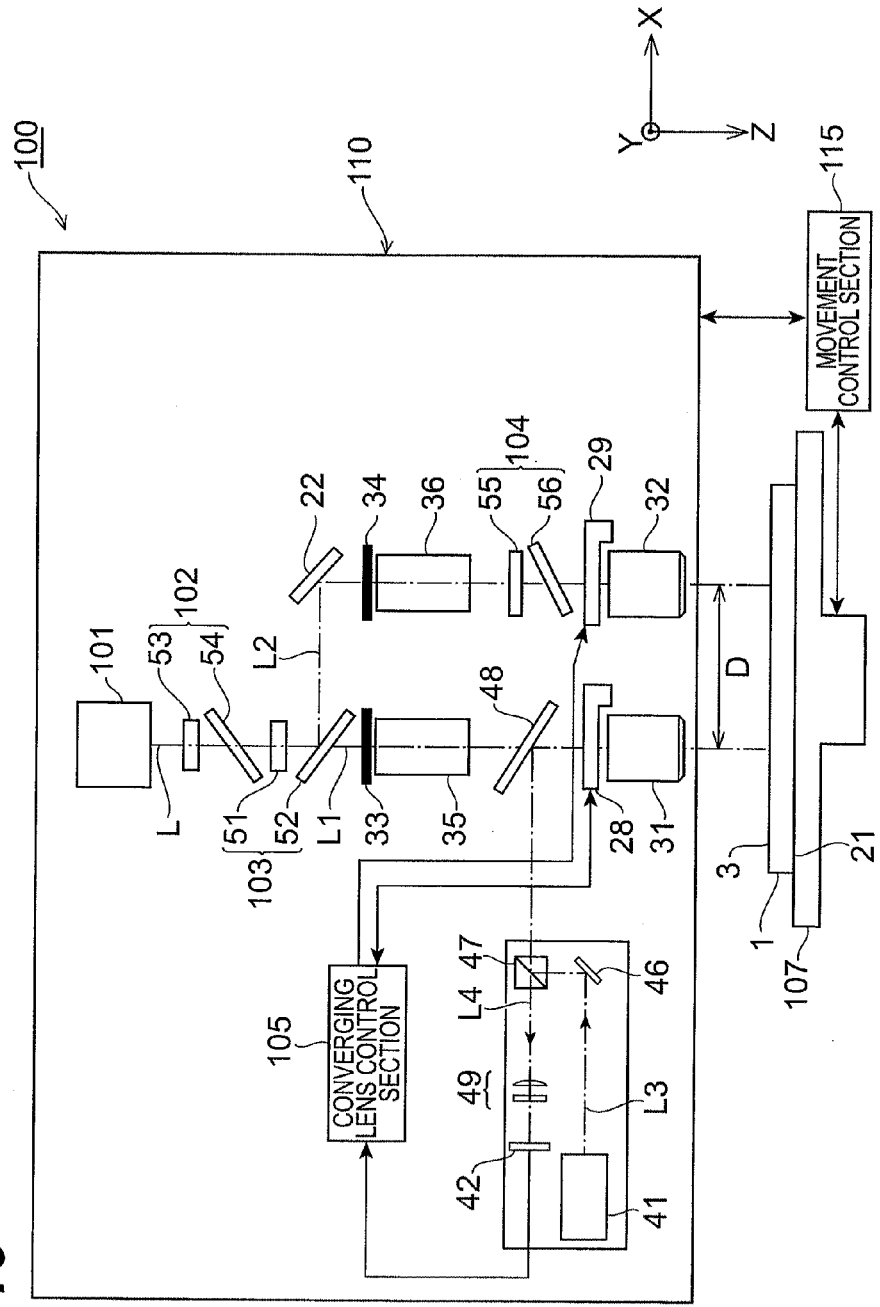
FIG. 16 is a schematic view illustrating the laser processing apparatus in accordance with an embodiment of the present invention.

As illustrated in FIG. 16, a laser processing apparatus 100 irradiates the planar object to be processed 1 with laser light (processing laser light) L while locating a converging point within the object 1, so as to form a plurality of rows of modified regions to become a cutting start 5 point within the object 1 along the lines 5 to cut the object 1.

The laser processing apparatus 100 comprises a mount table 107 for mounting the object 1 horizontally, a laser unit 110, and a movement control section (moving means) 115 for moving the mount table 107 and laser unit 110. The movement control section 115 moves the mount table 107 in horizontal directions (X and Y directions) and the laser unit 110 in vertical directions (Z directions).

The laser unit 110 is equipped with a processing laser light source 101 for pulse-oscillating linearly polarized processing laser light L having a polarization direction in the X direction (predetermined direction). The processing laser light L emitted from the processing laser light source 101 passes through an attenuator 102 for adjusting the light quantity of the processing laser light L, so as to be guided to a separator 103 for splitting it into a linearly polarized processing laser light component L1 having a polarization direction in the X direction and a linearly polarized processing laser light component L2 having a polarization direction in the Y direction (direction intersecting the predetermined direction).

The split processing laser light component L1 is successively guided to a shutter 33 for transmitting or blocking the processing laser light component L1, a beam expander 35 for expanding its beam size, and a dichroic mirror 48, and then is converged by a converging lens (first converging lens) 31, so as to irradiate the object 1. The converging lens 31 is one which converges the processing laser light component L1 and measuring laser light L3, which will be explained later, toward the object 1. A piezoelectric device 28 is attached to the converging lens 31, so as to adjust the Z-directional position of the converging lens 31. The dichroic mirror 48 transmits the processing laser light component L1 therethrough but reflects the measuring laser light L3 and its reflected light component L4, which will be explained later.

On the other hand, the split processing laser light component L2 is successively guided to a mirror 22, a shutter 34, and a beam expander 36, so as to be turned into linearly polarized light having a polarization direction in the X direction by an attenuator 104, and then is converged by a converging lens (second converging lens) 32, so as to irradiate the object 1. The converging lens 32, which is arranged in parallel with the converging lens 31 while being separated therefrom by a predetermined distance D in the X direction, converges the processing laser light component L2 toward the object 1. Here, the distance D is 35 mm. A piezoelectric device 29 is attached to the converging lens 32 as with the converging lens 31, so as to adjust the Z-directional position of the converging lens 32.

The laser unit 110 also has a measuring laser light source 41 using a laser diode, for example. The measuring laser light source 41 emits the measuring laser light L3 for irradiating the object 1, so as to measure the displacement of the front face 3 of the object 1, whereby a modified region can accurately be formed at a desirable position within the object 1. The measuring laser light L3 emitted from the measuring laser light source 41 is successively reflected by a mirror 46 and a half mirror 47, so as to be guided to the dichroic mirror 48. Then, the measuring laser light L3 advances downward on the optical axis of the processing laser light component L1, so as to be converged by the converging lens 31, thus irradiating the object 1. The reflected light component L4 of the measuring laser light L3 reflected by the front face (laser light irradiation surface) 3 of the object 1 is made incident on the converging lens 31 again, so as to advance upward on the optical axis of the processing laser light component L1, and then is reflected by the dichroic mirror 48 and transmitted through the half mirror 47.

The reflected light component L4 of the measuring laser light transmitted through the half mirror 47 is provided with astigmatism and converged by a shaping optical system 49 composed of a cylindrical lens and a planoconvex lens, so as to irradiate a quadrant photodiode 42 constructed by equally dividing a photodiode into four, thereby forming a converged light image on a light-receiving surface of the quadrant photodiode 42. In response to the displacement of the front face 3 of the object 1, the converged light image varies because of the astigmatism added thereto by the shaping optical system 49. Hence, the quadrant photodiode 42 acquires displacement information concerning the displacement of the front face 3 as a voltage value. A converging lens control section (control means) 105 is connected to the quadrant photodiode 42. The above-mentioned piezoelectric devices 28, 29 are connected to the converging lens control section 105. The converging lens control section 105 controls the driving of the piezoelectric devices 28, 29 according to the acquired voltage value and the like such that converging points of the processing laser light components L1, L2 converged by the converging lenses 31, 32 are located at predetermined positions with reference to the front face 3.

Specifically, the converging lens control section 105 executes control for operating the converging lens 31 such that the front face 3 of the object 1 and the converging lens 31 are separated from each other by a fixed distance therebetween according to the voltage value acquired by the quadrant photodiode 42 and, while acquiring operation information concerning this operation, operating the converging lens 32 according to the operation information and the distance D.

More specifically, the converging lens control section 105 executes the following control. In a state where the converging lenses 31, 32 are arranged on the same line to cut 5 (in a state where the X direction that is the polarization direction of the processing laser light substantially coincides with the line to cut 5), when relatively moving the mount table 107 along this line to cut 5, the piezoelectric device 28 is driven such that the voltage value acquired by the quadrant photodiode 42 becomes constant, thus operating the converging lens 31 such as to keep a constant distance between the front face 3 of the object 1 and the converging lens 31. Also, while memorizing a command voltage having driven the piezoelectric device 28 as command voltage data in association with the coordinate along the line to cut 5, the command voltage data at the X-coordinate of the converging lens 32 (the coordinate obtained by adding the distance D to the X-coordinate of the converging lens 31) is reproduced by the piezoelectric device 29, so as to operate the converging lens 32. In other words, the piezoelectric device 29 reproduces the memorized voltage data with a delay required for relatively moving the mount table 107 by the distance D, so as to operate the converging lens 32.

The converging lens control section 105 executes control for operating the converging lens 31 according to the operation information acquired beforehand and operating the converging lens 32 according to the operation information acquired beforehand and the distance D.

More specifically, the converging lens control section 105 executes the following control. In the state where the converging lenses 31, 32 are arranged on the same line to cut 5, when relatively moving the mount table 107 along this line to cut 5, the voltage data at the X-coordinate of the converging lens 31 in the already memorized command voltage data is reproduced by the piezoelectric device 28, so as to operate the converging lens 31. Also, the voltage data at the X-coordinate of the converging lens 32 in the already memorized command voltage data is reproduced by the piezoelectric device 29, so as to operate the converging lens 32.

Meanwhile, the laser processing apparatus 100 is provided with the separator 103 as mentioned above. The separator 103 has a half-wave plate (first half-wave plate) 51 and a polarizing plate 52. Specifically, the half-wave plate 51 and polarizing plate 52 are arranged in this order on the optical axis of the processing laser light L.

The half-wave plate 51 is rotatable about the optical axis of the processing laser light L and thus can change the polarization direction of the processing laser light L to a given direction. That is, the half-wave plate 51 lets the processing laser light L whose polarization direction is in the X direction to have a polarization direction forming an angle of 45° or 60° with the X axis within a horizontal plane (X-Y plane), for example.

The polarizing plate 52 splits the processing laser light L into the processing laser light component L1 having a polarization direction in the X direction and the processing laser light component L2 having a polarization direction in the Y direction. Specifically, in the processing laser light L, the polarizing plate 52 transmits therethrough a processing laser light component having a polarization direction in the X direction as the processing laser light component L1 toward the converging lens 31, while reflecting a processing laser light component having a polarization direction in the Y direction as the processing laser light component L2 toward the converging lens 32.

The laser processing apparatus 100 is provided with the attenuators 102, 104 as mentioned above. The attenuator 102 has a half-wave plate 53 and a polarizing plate 54, which are arranged on the optical axis of the processing laser light L in this order in the emitting direction of the processing laser light L. In the attenuator 102, the half-wave plate 53 changes the direction of polarization of the processing laser light L, while the polarizing plate 54 transmits only the processing laser light L having the polarization direction in the X direction. Hence, the attenuator 102 mainly functions as a so-called attenuator which regulates the light quantity of the processing laser light L, so as to freely adjust (change) the total output of the processing laser light L.

The attenuator 104 has a half-wave plate (second half-wave plate) 55 and a polarizing plate 56, which are arranged on the optical axis of the processing laser light component L2 in this order in the emitting direction of the processing laser light component L2. The half-wave plate 55 changes the polarization direction of the laser light component to the X direction as in the processing laser light component L1. Hence, the half-wave plate 55 mainly functions as a so-called polarizer which makes the polarization direction of the processing laser light component L2 identical to that of the processing laser light component L1. The polarizing plate 56 transmits therethrough only the processing laser light component L2 having the polarization direction in the X direction toward the converging lens 32.

When cutting the object 1 with the laser processing apparatus 100 explained in the foregoing, an expandable tape, for example, is initially attached to the rear face 21 of the object 1, which is then mounted on the mount table 107. Subsequently, the object 1 is irradiated with the processing laser light L from the front face 3 while locating a converging point within the silicon wafer 11, so as to form a modified region to become a cutting start point within the object 1 along each line to cut 5. Then, the expandable tape is expanded. As a consequence, the object 1 is accurately cut into the functional devices 15 along the line to cut 5 from the modified region acting as the cutting start point, whereby a plurality of semiconductor chips are separated from each other. The modified region may include not only the molten processed region but also crack regions and the like.

The forming of the modified region mentioned above will now be explained in more detail. Here, the following explanation will assume that the direction along the line to cut 5 and the thickness direction of the object 1 are the X direction (X-coordinate) and Z direction (Z-coordinate), respectively, as in the above.

Setting Height

First, while being focused on a reticle image, for example, projected on the front face 3 of the object 1, the measuring laser light L3 is emitted, the reflected light component L4 of the measuring laser light L3 reflected by the front face 3 is detected as a voltage value, and thus detected voltage value V0 is memorized. While using the Z-coordinate of the converging lens 31 at this time as a reference value (0 μm), the direction from the front face 3 side to the rear face 21 side is taken as a positive direction.

First Upward Cutting

Figure 17:
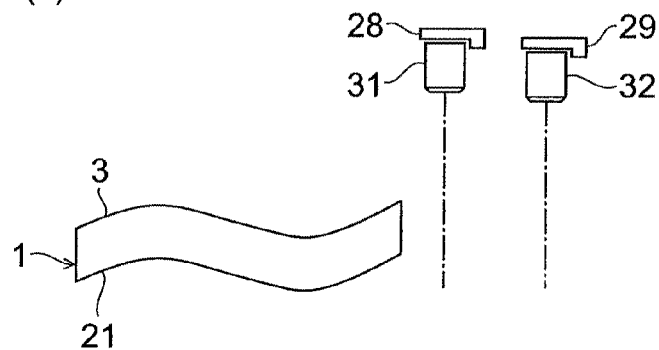
FIG. 17 is a partial sectional view taken along the line XVII-XVII of FIG. 14 for explaining a laser processing method by the laser processing apparatus of FIG. 16.
Figure 17:
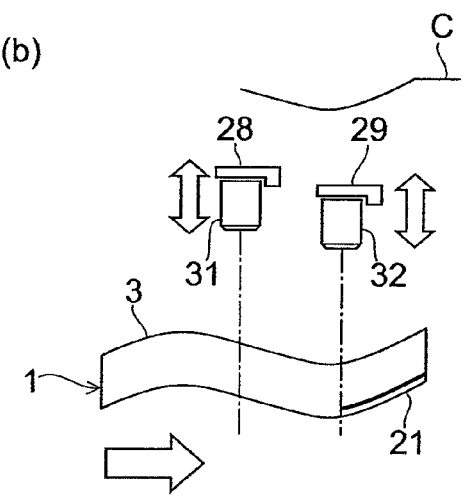
Figure 17:
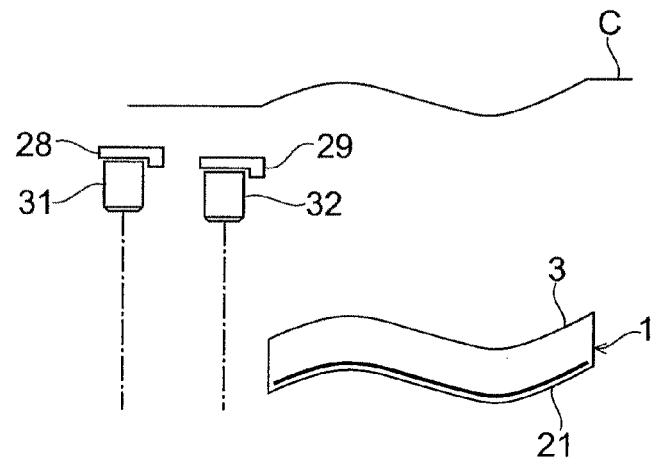

Subsequently, as illustrated in FIG. 17(a), the mount table 107 is moved such that the X-coordinate of the converging lens 31 becomes an X-coordinate distanced from the right end of the object 1 by 25 mm, for example. The X-coordinate of the converging lens 31 is an acceleration/deceleration distance of the mount table 107 required until the mount table 107 attains a constant moving speed. The acceleration/deceleration distance may be set as appropriate according to the moving speed of the mount table 107.

Subsequently, while the converging lenses 31, 32 are arranged on the same line to cut 5, the movement control section 115 moves the mount table 107 rightward along the line to cut 5, i.e., relatively moves the converging lenses 31, 32 in the direction (upward cutting direction) from the right end to left end of the object 1. The following operation is executed along with this movement.

As illustrated in FIG. 17(b), the measuring laser light source 41 emits the measuring laser light L3, the quadrant photodiode 42 detects the voltage value of the reflected light component L4, the converging lens control section 105 drives the piezoelectric device 28 such that this voltage value becomes the voltage value V0, and the converging lens 31 is operated in the Z direction such that the distance between the front face 3 of the object 1 and the converging lens 31 is kept at that at the time of height setting. Also, the command voltage having driven the piezoelectric device 28 is memorized (stored) in association with the X-coordinate as command voltage data C in the converging lens control section 105. At the time of memorization, the shutter 33 is closed, whereby the converging lens 31 is reliably and easily inhibited from letting out the processing laser light L1 when emitting the measuring laser light L3. This is effective in particular when only the displacement of the front face 3 is measured by the measuring laser light L3 with the converging lens 31.

From the time when the X-coordinate of the converging lens 32 reaches the right end of the object 1 (i.e., the X-coordinate of the converging lens 31 reaches a position separated leftward from the right end of the object 1 by the distance D), the converging lens control section 105 causes the piezoelectric device 29 to reproduce the command voltage data at the X-coordinate of the converging lens 32 in the memorized command voltage data C, so as to operate the converging lens 32. Also, as illustrated in FIG. 17(b), the shutter 34 is opened, and the object 1 is irradiated with the processing laser light L2 while locating a converging point within the object 1, so as to form a modified region at a position of 73 μm in the Z direction with reference to the front face 3 of the object 1.

From the time when the X-coordinate of the converging lens 32 reaches the left end of the object 1, the moving speed of the mount table 107 is decelerated, and the shutter 34 is closed, so as to stop emitting the processing laser light component L2. Thereafter, as illustrated in FIG. 17(c), the mount table 107 is stopped moving when the coordinate is separated from the left end of the object 1 by 25 mm.

First Downward Cutting

Subsequently, the movement control section 115 moves the laser processing unit 110 in the Z direction, such that the Z-coordinate of the converging lens 31 becomes 65 μm, for example. Then, while the converging lenses 31, 32 are arranged on the same line to cut 5, the movement control section 115 moves the mount table 107 leftward along the line to cut 5, i.e., relatively moves the converging lenses 31, 32 in the direction (downward cutting direction) from the left end to right end of the object 1. Along with this movement, the following operation is executed.

Figure 18:
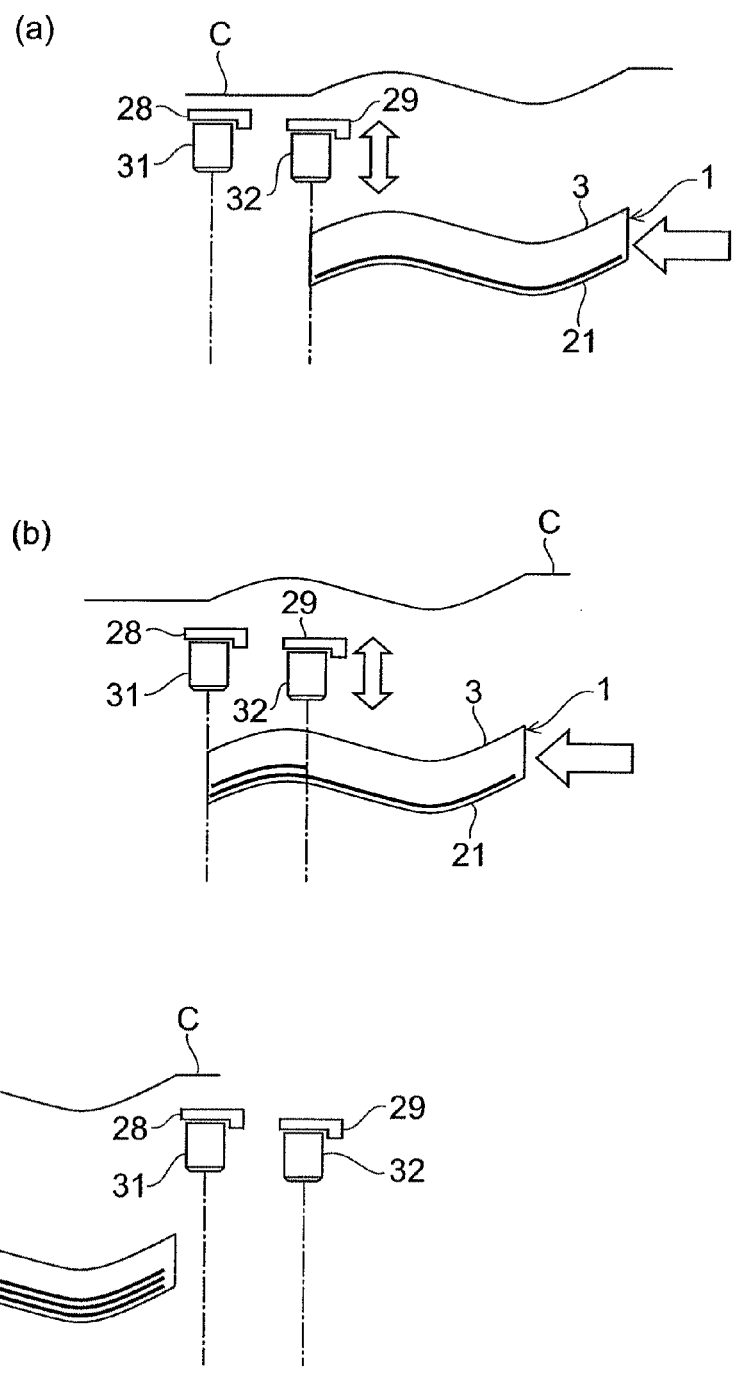
FIG. 18 is a partial sectional view taken along the line XVII-XVII of FIG. 14 for explaining the laser processing method subsequent to FIG. 17.

As illustrated in FIG. 18(*a*), from the time when the X-coordinate of the converging lens 32 reaches the left end of the object 1, the converging lens control section 105 causes the piezoelectric device 29 to reproduce the command voltage data C at the X-coordinate of the converging lens 32 in the already memorized command voltage data C, so as to operate the converging lens 32. In other words, the piezoelectric device 29 reproduces (reverse-reproduces) the memorized command voltage data C in the order in reverse to that at the time of acquisition, so as to operate the converging lens 32. Also, the shutter 34 is opened, and the object 1 is irradiated with the processing laser light component L2 while locating a converging point within the object 1, so as to form a modified region at a position of 65 μm in the Z direction with reference to the front face 3 of the object 1.

As illustrated in FIG. 18(*b*), from the time when the X-coordinate of the converging lens 31 reaches the left end of the object 1, the converging lens control section 105 causes the piezoelectric device 28 to reproduce the command voltage data C at the X-coordinate of the converging lens 31 in the already memorized command voltage data C, so as to operate the converging lens 31. In other words, the piezoelectric device 28 reverse-reproduces the memorized command voltage data C, so as to operate the converging lens 31. Also, the shutter 33 is opened, and the object 1 is irradiated with the processing laser light component L1 while locating a converging point within the object 1, so as to form a modified region at a position of 57 μm in the Z direction with reference to the front face 3 of the object 1.

From the time when the X-coordinate of the converging lens 32 reaches the right end of the object 1, the shutter 34 is closed, so as to stop emitting the processing laser light component L2. Then, from the time when the X-coordinate of the converging lens 31 reaches the right end of the object 1, the moving speed of the mount table 107 is decelerated, and the shutter 33 is closed, so as to stop emitting the processing laser light component L1. Thereafter, as illustrated in FIG. 18(*c*), the mount table 107 is stopped moving when the coordinate is separated from the right end of the object 1 by 25 mm.

Second Upward Cutting

Subsequently, the movement control section 115 moves the laser processing unit 110 in the Z direction, so that the Z-coordinate of the converging lens 31 becomes 48 μm, for example. Then, while the converging lenses 31, 32 are arranged on the same line to cut 5, the movement control section 115 moves the mount table 107 rightward again along the line to cut 5. Along with this movement, the following operation is executed.

Figure 19:
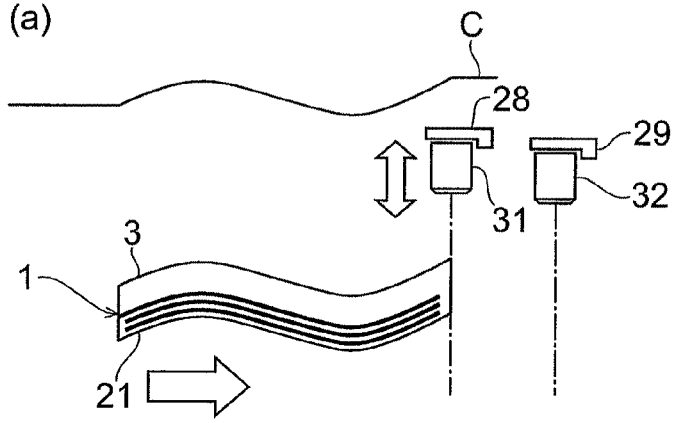
FIG. 19 is a partial sectional view taken along the line XVII-XVII of FIG. 14 for explaining the laser processing method subsequent to FIG. 18.
Figure 19:
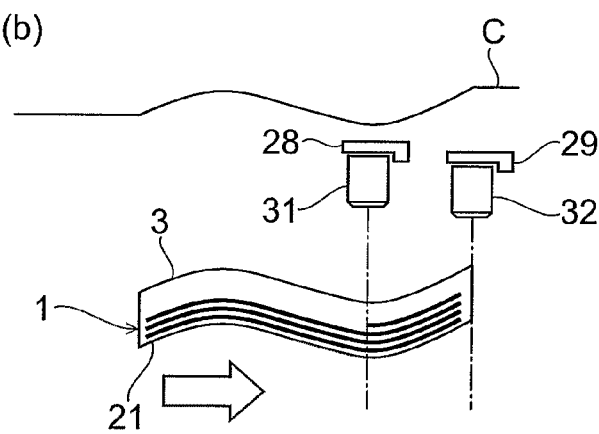
Figure 19:
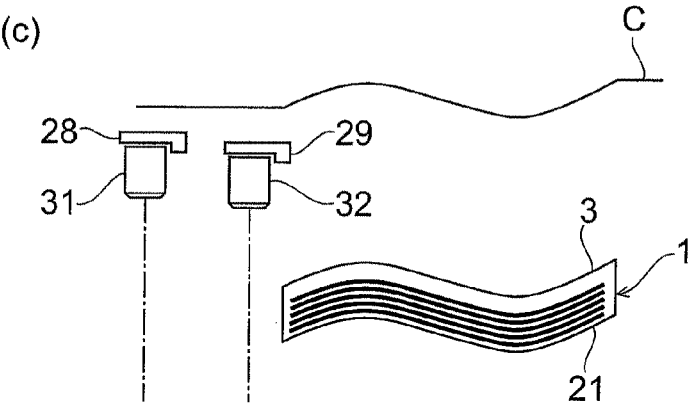

As illustrated in FIG. 19(*a*), from when the X-coordinate of the converging lens 31 reaches the right end of the object 1, the converging lens control section 105 causes the piezoelectric device 28 to reproduce the command voltage data C at the X-coordinate of the converging lens 31 in the already memorized command voltage data C, so as to operate the converging lens 31. Also, the shutter 33 is opened, and the object 1 is irradiated with the processing laser light component L1 while locating a converging point within the object 1, so as to form a modified region at a position of 48 μm in the Z direction with reference to the front face 3 of the object 1.

As illustrated in FIG. 19(*b*), from when the X-coordinate of the converging lens 32 reaches the right end of the object 1, the converging lens control section 105 causes the piezoelectric device 29 to reproduce the command voltage data C at the X-coordinate of the converging lens 32 in the already memorized command voltage data C, so as to operate the converging lens 32. Also, the shutter 34 is opened, and the object 1 is irradiated with the processing laser light component L2 while locating a converging point within the object 1, so as to form a modified region at a position of 38 μm in the Z direction with reference to the front face 3 of the object 1.

From the time when the X-coordinate of the converging lens 31 reaches the left end of the object 1, the shutter 33 is closed, so as to stop emitting the processing laser light component L1. Then, from the time when the X-coordinate of the converging lens 32 reaches the left end of the object 1, the moving speed of the mount table 107 is decelerated, and the shutter 34 is closed, so as to stop emitting the processing laser light component L2. Thereafter, as illustrated in FIG. 19(*c*), the mount table 107 is stopped moving when the coordinate is separated from the right end of the object 1 by 25 mm.

Second Downward Cutting

Subsequently, the movement control section 115 moves the laser processing unit 110 in the Z direction, so that the Z-coordinate of the converging lens 31 becomes 25 μm, for example. Then, while the converging lenses 31, 32 are arranged on the same line to cut 5, the movement control section 115 moves the mount table 107 leftward along the line to cut 5. Along with this movement, an operation similar to that in the above-mentioned first downward cutting is executed, so as to form modified regions at positions of 25 μm and 15 μm, respectively, with reference to the front face 3 of the object 1.

The foregoing forms a plurality of rows of modified regions, which become cutting start regions, in the thickness direction of the object 1 along the lines to cut 5 (see FIG. 14).

Thus, in this embodiment, the linearly polarized processing laser light L having a polarization direction in the X direction is emitted from the processing laser light source 101 and, after its polarization direction is changed by the half-wave plate 51, is made incident on the polarizing plate 52. The polarizing plate 52 splits the processing laser light L into the processing laser light component L1 whose polarization direction is the X direction and the processing laser light component L2 whose polarization direction is the Y direction. Then, the half-wave plate 55 changes the processing laser light component L2 into linearly polarized light whose polarization direction is the X direction. Hence, the processing laser light L is split into components incident on the converging lenses 31, 32, respectively, as linearly polarized light whose polarization direction is the X direction.

As in the above-mentioned first upward cutting, as the movement control section 115 relatively moves the mount table 107 along the line to cut 5 in a state where the X direction substantially coincides with the line to cut 5, the measuring laser light source 41 emits the measuring laser light L3, the quadrant photodiode 42 detects the voltage value of the reflected light component L4, the converging lens control section 105 drives the piezoelectric device 28 such that the voltage value becomes V0, and the converging lens 31 is operated in the Z direction such that the distance at the time of height setting is kept between the front face 3 of the object 1 and the converging lens 31. Also, the command voltage having driven the piezoelectric device 28 is memorized in the converging lens control section 105 as command voltage data C associated with the X-coordinate. The converging lens control section 105 causes the piezoelectric device 29 to reproduce the command voltage data at the X-coordinate of the converging lens 32 in the memorized command voltage data C, and irradiates the object 1 with the processing laser light component L2 while operating the converging lens 32, so that the converging point of the processing laser light component L2 is located at a predetermined position with reference to the front face 3. These make it possible to measure the displacement of the front face 3 with the measuring laser light L3 and form modified regions with the processing laser light component L2 at the same time, whereby the object 1 is not required to be traced beforehand even when it is relatively thick.

As in the above-mentioned first downward cutting and the like, as the movement control section 115 relatively moves the mount table 107 along the line to cut 5 in a state where the X direction substantially coincides with the line to cut 5, the converging lens control section 105 causes the piezoelectric device 29 to reproduce the command voltage data C at the X-coordinate of the converging lens 32 in the already memorized command voltage data C, so as to operate the converging lens 32, and causes the piezoelectric device 28 to reproduce the command voltage data C at the X-coordinate of the converging lens 31 in the already memorized command voltage data C, so as to operate the converging lens 31. Therefore, at least two rows of modified regions can simultaneously be formed within the object 1, so that the number of repeating scans of the processing laser light along the same line to cut can be reduced when forming a plurality of rows of modified regions in the thickness direction of the object 1.

Hence, while it is necessary for a conventional laser processing apparatus to repeat scans including traces eight times when forming seven rows (odd rows) of modified regions in the thickness direction within the object 1 along the line to cut 5, four scans (½ that of the above) suffice in this embodiment. Therefore, this embodiment can shorten not only the time for forming modified layers in the laser processing but also takt time, thereby reducing the running cost.

In this embodiment, the half-wave plate 53 changes the polarization direction of the processing laser light L to a given direction as mentioned above, so that the polarization direction of the processing laser light L transmitted through the half-wave plate 53 becomes the given direction, whereby portions of light quantities of the processing laser light components L1, L2 split by the polarizing plate 52 can be adjusted arbitrarily.

In this embodiment, as mentioned above, the mount table 107 is moved by the movement control section 115 in a state where the polarization directions of the processing laser light components L1, L2 substantially coincide with the line to cut 5. This makes it possible to efficiently form modified regions along the lines to cut. This is because the forming of modified regions by irradiation with the polarized processing laser light is accelerated in its polarization direction (has a property of expanding in the polarization direction of the laser light). Further, since the polarization directions of the laser light components L1, L2 substantially coincide with the lines to cut 5, the modified regions are restrained from being formed in directions other than those along the lines to cut 5, whereby the object 1 can precisely be cut along the lines to cut 5.

Though this embodiment closes the shutter 33 when emitting the measuring laser light L3, so that the converging lens 31 does not converge the processing laser light component L1 toward the object 1, this is not restrictive. For example, when emitting the measuring laser light L3, the shutter 33 may be opened, so that the converging lens 31 also converges the processing laser light component L1 toward the object 1, thereby forming modified regions within the object 1 with the processing laser light component L1 while detecting information about the displacement of the front face 3 of the object 1 (so-called real-time processing) as a matter of course. Thus, when carrying out real-time processing with the laser processing apparatus 100 of this embodiment, scans for performing tracing alone (scans performing no processing with the processing laser light source L2) are unnecessary even when an even number of rows of modified regions are to be formed in the thickness direction of the object.

The object 1 was processed with each of the laser processing apparatus 100 in accordance with the embodiment explained above and a conventional laser processing apparatus. As a result, the laser processing apparatus 100 in accordance with the embodiment was able to shorten takt time by about 40% with reference to that of the conventional processing apparatus, whereby the above-mentioned effect, i.e., the effect of shortening the time for forming the modified layers in the laser processing, has been verified.

Though a preferred embodiment of the present invention has been explained in the foregoing, the present invention is not limited to the above-mentioned embodiment.

For example, though the above-mentioned embodiment measures the displacement of the laser light irradiation surface 3 by providing the measuring laser light source 41 on the optical axis side of the converging lens 31 as a preferred mode for making the optical system simple and inexpensive in the laser processing apparatus 100, the displacement of the laser light irradiation surface may be measured by providing the laser light source on the optical axis side of the converging lens 32 as a matter of course, or both of them may be provided as well.

Though the laser processing apparatus 100 in accordance with the above-mentioned embodiment is equipped with two converging lenses 31, 32, it may comprise three or more lenses. Effects similar to those mentioned above are exhibited in the latter case as well.

Though the above-mentioned embodiment moves the mount table 107 along the lines to cut 5, the converging lenses 31, 32 may be moved along the lines to cut as well.

Not only the silicon wafer 11, but semiconductor compound materials such as gallium arsenide, piezoelectric materials, and crystalline materials such as sapphire, for example, may also be used. In this embodiment, the processing laser light may be emitted under various conditions without being limited by pulse pitch width, output, and the like.

INDUSTRIAL APPLICABILITY

The present invention makes it possible to provide a laser processing apparatus which can shorten the time required for forming a modified region within an object to be processed.

The invention claimed is:
1. A laser processing apparatus for irradiating a planar object to be processed with processing laser light while locating a converging point within the object, so as to form modified regions to become a cutting start point within the object along a cutting line to cut the object, the apparatus comprising:
   a mount table for mounting the object;
   a processing laser light source for emitting the processing laser light as linearly polarized light;

a measuring laser light source for emitting measuring laser light for irradiating the object;

a first half-wave plate for changing a polarization direction of the processing laser light emitted from the processing laser light source;

a polarizing plate for splitting the processing laser light transmitted through the first half-wave plate into a processing laser light component having a polarization direction in a predetermined direction and a processing laser light component having a polarization direction in a direction intersecting the predetermined direction;

a second half-wave plate for changing the polarization direction of the processing laser light component, split by the polarizing plate, having the polarization direction in the direction intersecting the predetermined direction into the predetermined direction;

a first converging lens for converging the processing laser light component, split by the polarizing plate, having the polarization direction in the predetermined direction and the measuring laser light emitted from the measuring laser light source toward the object;

a second converging lens having an optical axis that is arranged in parallel with an optical axis of the first converging lens along the predetermined direction and separated from the first converging lens by a predetermined distance, for converging the processing laser light component, transmitted through the second half-wave plate, having the polarization direction in the predetermined direction toward the object;

control arrangement that detects a reflected light component of the measuring laser light reflected by a laser light irradiation surface irradiated with the measuring laser light in the object so as to regulate a distance between the laser light irradiation surface and the second converging lens such that a converging point of the processing laser light converged by the second converging lens is located at a predetermined position with reference to the laser light irradiation surface; and moving arrangement that relatively moves at least one of a pair of the first and second converging lenses and the mount table along the cutting line in a state where the predetermined direction substantially coincides with the cutting line, wherein the control arrangement executes:

first control for operating the first converging lens such that the first converging lens is separated from the laser light irradiation surface by a constant distance and, while acquiring operation information concerning the operation, operating the second convergent lens according to the operation information and the predetermined distance; and second control for operating the first converging lens according to the operation information and operating the second converging lens according to the operation information and the predetermined distance, the first and second control being performed by arranging the first and the second converging lenses along the cutting line and moving the first and second converging lenses together along the cutting line relative to the object, at the operation of the first control, irradiating the object with the measuring laser light by using the first converging lens, detecting the reflected light of the measuring laser, and while acquiring operation information concerning the operation, operating the first converging lens such that the first converging lens is separated from the laser light irradiation surface by a constant distance;

from the time at which the optical axis of the second converging lens reaches the end of the object, irradiating the object with the processing laser light by using the second converging lens while operating the second converging lens according to the operation information and the predetermined distance to form a first modified region within the object, and at the operation of the second control, from the time at which the optical axis of the second converging lens reaches the other end of the object, irradiating the object with the processing laser light by using the second converging lens while operating the second converging lens according to the operation information and the predetermined distance to form a second modified region within the object;

from the time at which the optical axis of the first converging lens reaches the other end of the object, irradiating the object with the processing laser light by using the first converging lens while operating the first converging lens according to the operation information and the predetermined distance to form a third modified region within the object.

2. A laser processing apparatus for irradiating a planar object to be processed with processing laser light while locating a converging point within the object, so as to form modified regions to become a cutting start point within the object along a cutting line to cut the object, the apparatus comprising:

a mount table for mounting the object;

a processing laser light source for emitting the processing laser light as linearly polarized light;

a measuring laser light source for emitting measuring laser light for irradiating the object;

a first half-wave plate for changing a polarization direction of the processing laser light emitted from the processing laser light source;

a polarizing plate for splitting the processing laser light transmitted through the first half-wave plate into a processing laser light component having a polarization direction in a predetermined direction and a processing laser light component having a polarization direction in a direction intersecting the predetermined direction;

a second half-wave plate for changing the polarization direction of the processing laser light component, split by the polarizing plate, having the polarization direction in the direction intersecting the predetermined direction into the predetermined direction;

a first converging lens for converging the processing laser light component, transmitted through the second half-wave plate, having the polarization direction in the predetermined direction and the measuring laser light emitted from the measuring laser light source toward the object;

a second converging lens having an optical axis that is arranged in parallel with an optical axis of the first converging lens along the predetermined direction and separated from the first converging lens by a predetermined distance, for converging the processing laser light component, split by the polarizing plate, having the polarization direction in the predetermined direction toward the object;

control arrangement that detects a reflected light component of the measuring laser light reflected by a laser light irradiation surface irradiated with the measuring laser light in the object so as to regulate a distance between the laser light irradiation surface and the second converging lens such that a converging point of the processing laser light converged by the second converging lens is located at a predetermined position with reference to the laser light irradiation surface; and moving arrangement that relatively moves at least one of a pair of the first and second converging lenses and the mount table along the cutting line in a state where the predetermined direction substantially coincides with the cutting line, wherein the control arrangement executes:

first control for operating the first converging lens such that the first converging lens is separated from the laser light irradiation surface by a constant distance and, while acquiring operation information concerning the operation, operating the second convergent lens according to the operation information and the predetermined distance; and second control for operating the first converging lens according to the operation information and operating the second converging lens according to the operation information and the predetermined distance, the first and second control being performed by arranging the first and the second converging lenses along the cutting line and moving the first and second converging lenses together along the cutting line relative to the object, at the operation of the first control, irradiating the object with the measuring laser light by using the first converging lens, detecting the reflected light of the measuring laser, and while acquiring operation information concerning the operation, operating the first converging lens such that the first converging lens is separated from the laser light irradiation surface by a constant distance;

from the time at which the optical axis of the second converging lens reaches the end of the object, irradiating the object with the processing laser light by using the second converging lens while operating the second converging lens according to the operation information and the predetermined distance to form a first modified region within the object, and at the operation of the second control, from the time at which the optical axis of the second converging lens reaches the other end of the object, irradiating the object with the processing laser light by using the second converging lens while operating the second converging lens according to the operation information and the predetermined distance to form a second modified region within the object;

from the time at which the optical axis of the first converging lens reaches the other end of the object, irradiating the object with the processing laser light by using the first converging lens while operating the first converging lens according to the operation information and the predetermined distance to form a third modified region within the object.

3. A laser processing apparatus according to claim 1, wherein the control arrangement detects the reflected light component of the measuring laser light reflected by the laser light irradiation surface so as to regulate a distance between the laser light irradiation surface and the first converging lens such that a converging point of the processing laser light converged by the first converging lens is located at a predetermined position with reference to the laser light irradiation surface.

4. A laser processing apparatus according to claim 1, wherein the first half-wave plate changes the polarization direction of the processing laser light to a given direction.

5. A laser processing apparatus according to claim 1, further comprising an attenuator, arranged between the processing laser light source and the first half-wave plate in an optical path of the processing laser light, for adjusting a light quantity of the processing laser light.

6. A laser processing apparatus according to claim 1, further comprising a shutter, arranged between the polarizing plate and the first converging lens in an optical path of the processing laser light, for blocking the processing laser light from being made incident on the first converging lens.

7. A laser processing apparatus according to claim 2, wherein the control arrangement detects the reflected light component of the measuring laser light reflected by the laser light irradiation surface so as to regulate a distance between the laser light irradiation surface and the first converging lens such that a converging point of the processing laser light converged by the first converging lens is located at a predetermined position with reference to the laser light irradiation surface.

8. A laser processing apparatus according to claim 2, wherein the first half-wave plate changes the polarization direction of the processing laser light to a given direction.

9. A laser processing apparatus according to claim 2, further comprising an attenuator, arranged between the processing laser light source and the first half-wave plate in an optical path of the processing laser light, for adjusting a light quantity of the processing laser light.

10. A laser processing apparatus according to claim 2, further comprising a shutter, arranged between the polarizing plate and the first converging lens in an optical path of the processing laser light, for blocking the processing laser light from being made incident on the first converging lens.

* * * * *

UNITED STATES PATENT AND TRADEMARK OFFICE
CERTIFICATE OF CORRECTION

PATENT NO. : 8,610,028 B2  Page 1 of 1
APPLICATION NO. : 12/443045
DATED : December 17, 2013
INVENTOR(S) : Kuno et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 810 days.

Signed and Sealed this
Twenty-second Day of September, 2015

Michelle K. Lee
*Director of the United States Patent and Trademark Office*